US011249327B2

(12) United States Patent
Kamibeppu et al.

(10) Patent No.: US 11,249,327 B2
(45) Date of Patent: Feb. 15, 2022

(54) LENS AND EYEWEAR

(71) Applicant: Mitsui Chemicals, Inc., Tokyo (JP)

(72) Inventors: Tsuyoshi Kamibeppu, Nagoya (JP); Hirofumi Asada, Niihama (JP); Akifumi Aono, Nagoya (JP); Akihiro Muramatsu, Marugame (JP); Toshifumi Hino, Saijo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 211 days.

(21) Appl. No.: 16/474,196

(22) PCT Filed: Oct. 6, 2017

(86) PCT No.: PCT/JP2017/036555
§ 371 (c)(1),
(2) Date: Jun. 27, 2019

(87) PCT Pub. No.: WO2018/123195
PCT Pub. Date: Jul. 5, 2018

(65) Prior Publication Data
US 2019/0324294 A1 Oct. 24, 2019

(30) Foreign Application Priority Data

Dec. 27, 2016 (JP) .............................. JP2016-253581
Dec. 27, 2016 (JP) .............................. JP2016-253582
Feb. 28, 2017 (JP) .............................. JP2017-037313

(51) Int. Cl.
*G02C 7/08* (2006.01)
(52) U.S. Cl.
CPC .................... *G02C 7/083* (2013.01)

(58) Field of Classification Search
CPC ...... G02C 7/083; G02C 7/081; G02C 2202/16; G02C 1/10
See application file for complete search history.

(56) References Cited

U.S. PATENT DOCUMENTS

| 9,470,909 B2 | 10/2016 | Willey |
| 2009/0256977 A1 | 10/2009 | Haddock et al. |
| 2010/0265456 A1 | 10/2010 | Matsui |

(Continued)

FOREIGN PATENT DOCUMENTS

| JP | 2011516927 A | 5/2011 |
| JP | 2015522842 A | 8/2015 |
| JP | 2016126145 A | 7/2016 |

(Continued)

OTHER PUBLICATIONS

Extended European Search Report dated Jul. 10, 2020.
International Search Report from International Application No. PCT/JP2017/036555 dated Nov. 28, 2017.

*Primary Examiner* — Tuyen Tra
(74) *Attorney, Agent, or Firm* — Brundidge & Stanger, P.C.

(57) ABSTRACT

Provided is a lens that includes a lens body and an internal electrode at least a part of which is exposed to an outer edge part of the lens body. The lens is configured so that in the outer edge part of the lens body, the shape of a first region that includes an exposed part where the internal electrode is exposed and the shape of a second region that does not include the exposed part are different. This configuration makes it possible to provide a lens that can be easily attached to a frame.

11 Claims, 20 Drawing Sheets

(56) References Cited

U.S. PATENT DOCUMENTS

2014/0028966 A1 1/2014 Blum et al.
2018/0157061 A1 6/2018 Kikuchi et al.

FOREIGN PATENT DOCUMENTS

| WO | 2009081542 A1 | 7/2009 |
| WO | 2012/068527 A2 | 5/2010 |
| WO | 2012/068527 A3 | 5/2012 |
| WO | 2012/068527 A4 | 5/2012 |

LENS AND EYEWEAR

TECHNICAL FIELD

The present invention relates to a lens and eyewear.

BACKGROUND ART

Patent Literature (hereinafter, abbreviated as PTL) 1 and PTL 2 disclose lenses of eyewear. In each of these lenses, a focal length of a part of region can be changed with respect to a focal length of the other region based on energization of an internal electrode provided in the lens. This enables a user of eyewear provided with such a lens as described above to favorably view a thing disposed near the user through the above part of the region (that is, in a magnified view).

CITATION LIST

Patent Literature

PTL 1
Japanese Unexamined Patent Application Publication (Translation of PCT Application) No. 2011-516927
PTL 2
Japanese Patent Application Laid-Open No. 2016-126145

SUMMARY OF INVENTION

Technical Problem

Meanwhile, for attaching the lens as described above to a frame of the eyewear, it is desirable that the lens can be easily attached to the frame in a state where the internal electrode and the external electrode of the lens are arranged so as to be stably connectable to each other in a direct or indirect manner.

An object of the present invention is to provide a lens that is easily attachable to a frame, and eyewear having the lens.

Solution to Problem

A lens according to the present invention includes: a lens body; and an internal electrode that is attached to the lens body, at least a part of the internal electrode being exposed in an outer edge part of the lens body, in which a shape of a first region including an exposed part where the internal electrode is exposed and a shape of a second region not including the exposed part are different in the outer edge part of the lens body.

Advantageous Effects of Invention

The lens according to the present invention has an excellent effect that the lens is easily attachable to the frame. Further, the eyewear according to the present invention has an excellent effect that the lens is easily attachable to the frame.

DESCRIPTION OF EMBODIMENTS

Embodiment 1

Electronic glasses as eyewear according to Embodiment 1 of the present invention will be described with reference to FIGS. 1 to 7. Note that arrow FR appropriately illustrated in each drawing denotes the front side seen from a user wearing electronic glasses 10, arrow UP denotes the upper side, arrow RH denotes the right side, and arrow LH denotes the left side. Further, when front-rear, vertical, and lateral directions are used in the following description without being specified, those indicate front-rear, vertical, and lateral directions seen from the user of the electronic glasses.

In the following description of lenses 12, 14 and each member constituting lenses 12, 14, a "thickness direction" corresponds to the front-rear direction of electronic glasses 10, and a "width direction" corresponds to the lateral direction of electronic glasses 10. Moreover, when a "normal direction" is simply mentioned, this means a normal direction for an external shape of each of lenses 12, 14 (see a solid line β of FIG. 5) in a planar view from the front-rear direction (the state illustrated in FIG. 5). One side in the normal direction is a direction away from the center part of each of lenses 12, 14. Meanwhile, the other side in the normal direction is a direction closer to the center part of each of lenses 12, 14.

In the following embodiments, glasses will be illustrated as an example of the eyewear, but the eyewear is not limited thereto. The present invention may only be eyewear to be worn on or near the head, ears, or eyes of the user. The eyewear includes so-called glasses (including electronic glasses) having an auxiliary mechanism to improve the eyesight of the user, such as lenses, and various devices (for example, a glasses-type wearable terminal, a head-mounted display, and the like) having a mechanism to present information to the field of view, or the eyes, of the user.

Figure 1:
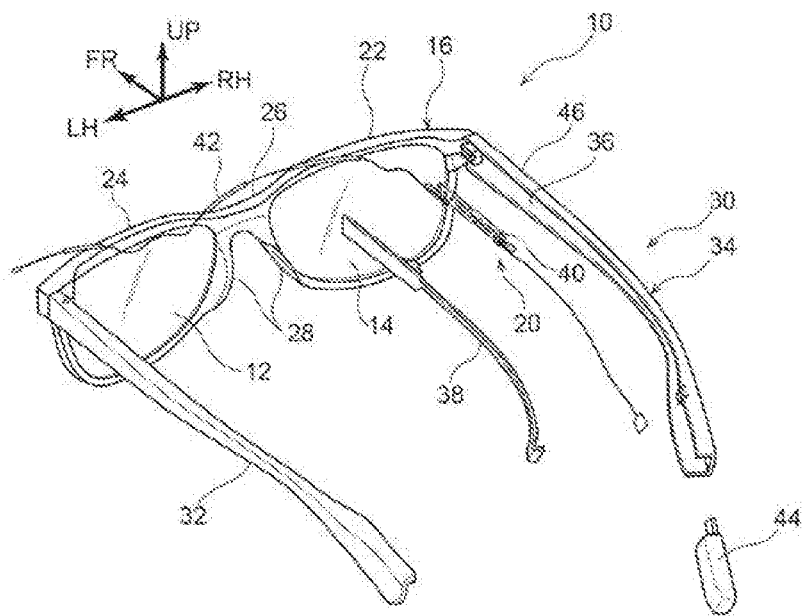
FIG. 1 is an exploded perspective view illustrating exploded electronic glasses of Embodiment 1 according to the present invention.
Figure 2:
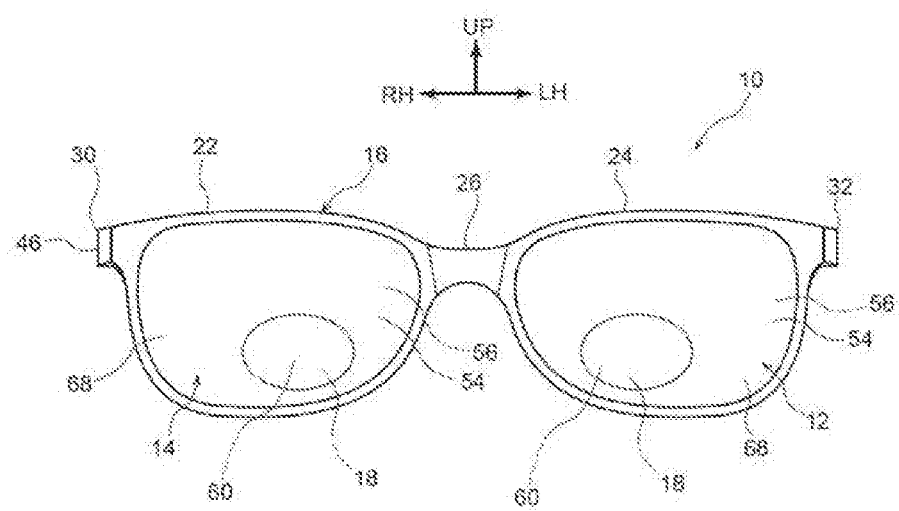
FIG. 2 is a front view illustrating the electronic glasses of Embodiment 1 according to the present invention.

As illustrated in FIGS. 1 and 2, in electronic glasses 10 of the present embodiment, a focal length (power) of a part of each of left and right lenses 12, 14 can be changed by a switching operation of the user. Specifically, electronic glasses 10 are provided with frame 16 to be worn by the user, a pair of left and right lenses 12, 14 held in frame 16, and liquid crystal driver 20 that drives liquid crystal 18 provided in lenses 12, 14.

Frame 16 has right-side rim 22, left-side rim 24, and bridge 26. Right-side rim 22 and left-side rim 24 hold right-side lens 14 and left-side lens 12, respectively. Right-side rim 22 and left-side rim 24 each have an annular shape in a front view (seen from the front side of the user of electronic glasses 10).

Bridge 26 links between right-side rim 22 and left-side rim 24 in the lateral direction. Frame 16 has pad parts 28, to be fitted onto the nose of the user, in portions of right-side rim 22 and left-side rim 24, the portions being adjacent to bridge 26.

Frame 16 is provided with right-side temple 30 (also referred to as temple) attached to a right-side end part of right-side rim 22 so as to be movable in an inclined manner, and left-side temple 32 (also referred to as temple) attached to a left-side end part of left-side rim 24 so as to be movable in an inclined manner.

As illustrated in FIG. 1, right-side temple 30 has right-side temple body 34 and lid part 38. Right-side temple body 34 has groove part 36 with the user side (also referred to as the inner side in the width direction) opened. Lid part 38 is attached to right-side temple body 34 to close groove part 36. Note that right-side temple 30 and left-side temple 32 are fitted onto the head and the right and left ears of the user when the user puts on electronic glasses 10.

Liquid crystal driver 20 changes the arrangement of liquid crystal 18 provided in each of lenses 12, 14 described later. Liquid crystal driver 20 has control module 40, flexible cable 42, battery 44, and switch 46. Each of flexible cable 42, battery 44, and switch 46 is connected to control module 40.

Control module 40 is disposed in groove part 36 of right-side temple body 34. Control module 40 is not exposed to the user side in a state where lid part 38 is attached to right-side temple body 34. Switch 46 is fixed to the opposite side of right-side temple body 34 from the user (the outer side in the width direction, and the opposite side to the side where groove part 36 is formed).

Note that switch 46 of the present embodiment is a capacitive touch switch that is operable by the user's touch. Battery 44 is removably attached to a rear end part of right-side temple 30.

Figure 3:
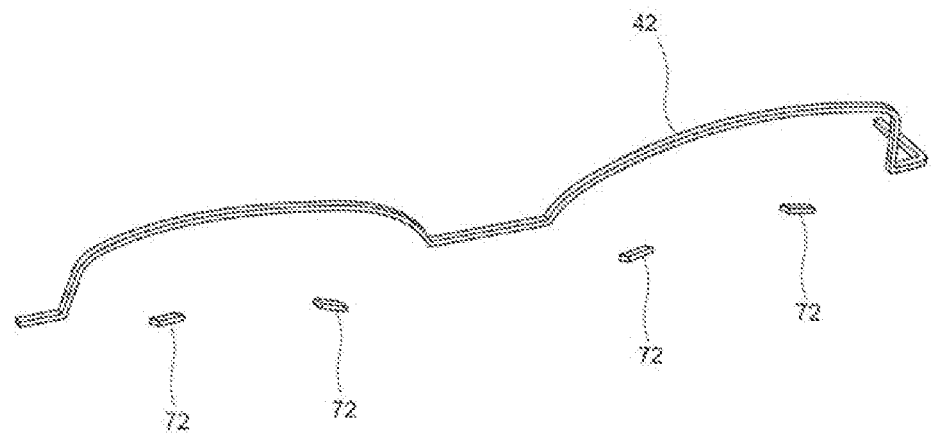
FIG. 3 is a perspective view illustrating a flexible cable and conductive rubber.

As illustrated in FIGS. 1 and 3, flexible cable 42 is provided from control module 40, disposed in right-side temple 30, extending to an upper-side portion of right-side rim 22, bridge 26, and upper-side portion of left-side rim 24.

Then, right-side lens 14 and left-side lens 12 are fixed to (mounted into) right-side rim 22 and left-side rim 24, respectively. In this state, flexible cable 42 and internal electrodes 48, 50 (see FIG. 4) are electrically connected through conductive rubber 72. Conductive rubber 72 is made of a conductive material and has viscoelasticity.

Note that conductive rubber 72 constitutes a part of flexible cable 42. Inside lens 12, a pair of conductive films (not illustrated) are arranged so as to sandwich liquid crystal 18 therebetween in the direction of arrow FR.

Internal electrodes 48, 50 are electrically connected to one and the other of the pair of conductive films, respectively. When a voltage is applied to internal electrodes 48, 50, the voltage is applied across the pair of conductive films. The orientation of liquid crystal 18 is controlled by an electric field generated due to the application of the voltage across the conductive films. For example, when cholesteric liquid crystal is employed as liquid crystal 18, a refractive index of liquid crystal 18 is controlled by controlling the voltage across internal electrodes 48 and 50.

Next, lenses 12, 14 being main parts of the present embodiment will be described. Note that right-side lens 14 and left-side lens 12 are formed to be symmetrical. Therefore, in the following, left-side lens 12 will be described, and for each part of right-side lens 14, the same numeral as that of left-side lens 12 will be provided and the description of right-side lens 14 will be omitted.

Figure 4:
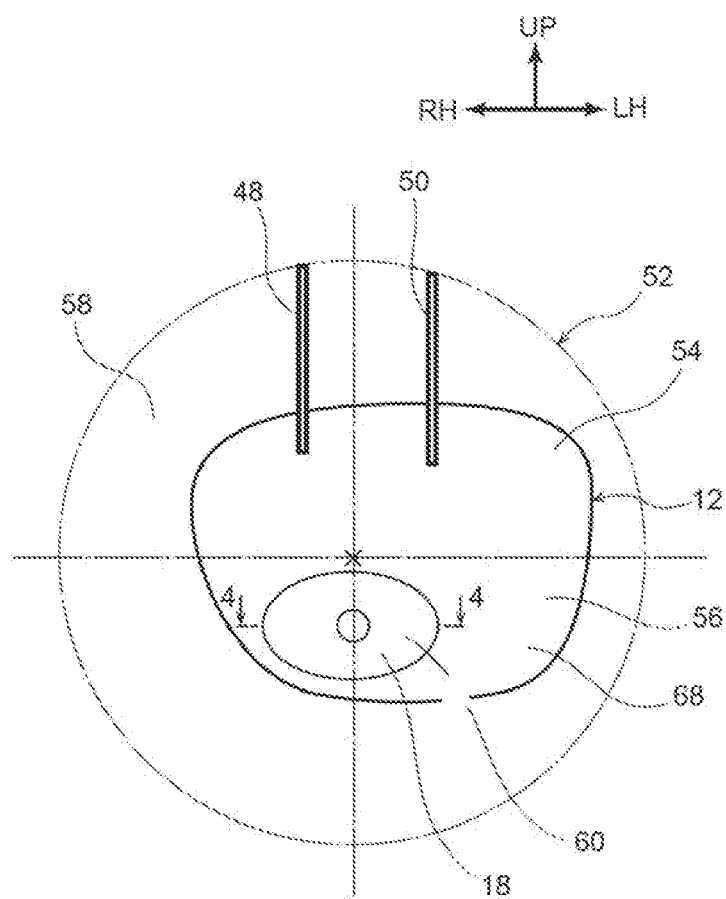
FIG. 4 is a front view illustrating a lens having been cut out of a lens blank.

As illustrated in FIG. 4, lens 12 is obtained by processing lens blank 52, having a circular outer edge in a front view, into a predetermined shape.

As illustrated in FIG. 4, lens blank 52 is provided with blank body 58 having front lens 54 and diffraction-section including lens 56 superimposed and joined in the thickness direction. Each of front lens 54 and diffraction-section including lens 56 is gently curved so as to form a shape protruding forward.

In addition, front lens 54 and a portion of diffraction-section including lens 56, the portion excluding a portion provided with diffraction section 60 described later, are joined via an adhesive layer, not illustrated. Note that internal electrodes 48, 50 described above are buried in this adhesive layer.

A part of diffraction-section including lens 56 has diffraction section 60 as a Fresnel lens part. Diffraction section 60 has a configuration of a so-called Fresnel lens that has a saw-blade shape in a cross section on the front lens 54 side (front side).

Liquid crystal 18 is intervened between diffraction section 60 of diffraction-section including lens 56 and front lens 54. In liquid crystal 18 (also referred to as refractive-index changing layer), the refractive index changes due to generation of the electric field by application of the voltage.

Figure 5:
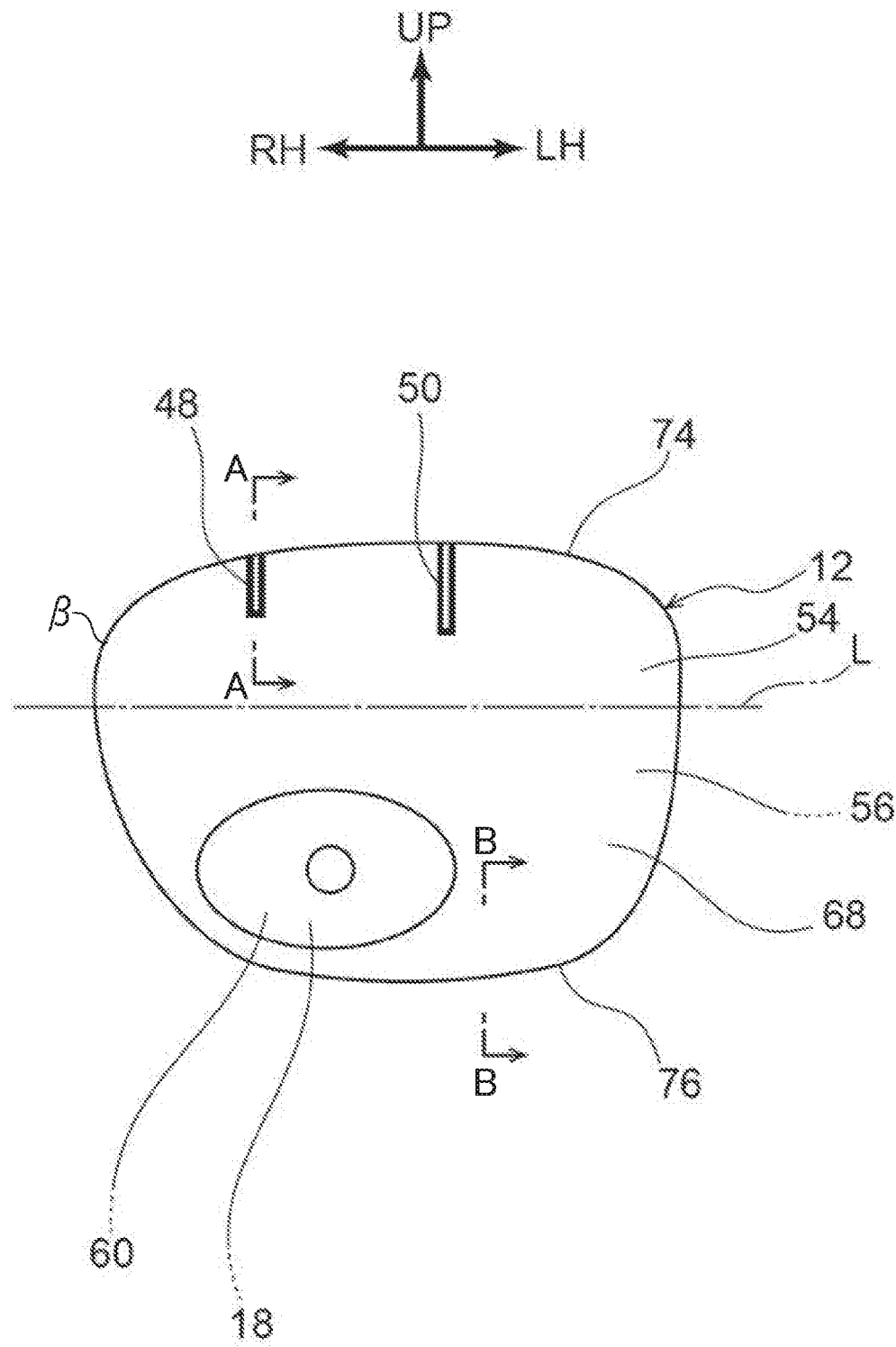
FIG. 5 is a front view illustrating the lens.

As illustrated in FIG. 5, lens 12 is formed by processing lens blank 52 into a shape corresponding to the shape of left-side rim 24 (see FIG. 1). Note that the configuration of lens body 68 of lens 12 corresponds to the configuration of blank body 58 of lens blank 52.

In lens 12 of the present embodiment, shapes of portions to be fitted into left-side rim 24 (that is, the shapes of the outer edge part) are different from each other, the shapes being separated by a dashed-dotted line L illustrated in FIG. 5 as the boundary.

In lens 12, the portion fitted into left-side rim 24 above dashed-dotted line L is first fitting part 74 (also referred to as first region). Meanwhile, in lens 12, the portion fitted into left-side rim 24 below dashed-dotted line L is second fitting part 76 (also referred to as second region). That is, dashed-dotted line L indicates the boundary position between first fitting part 74 and second fitting part 76.

Figure 6:
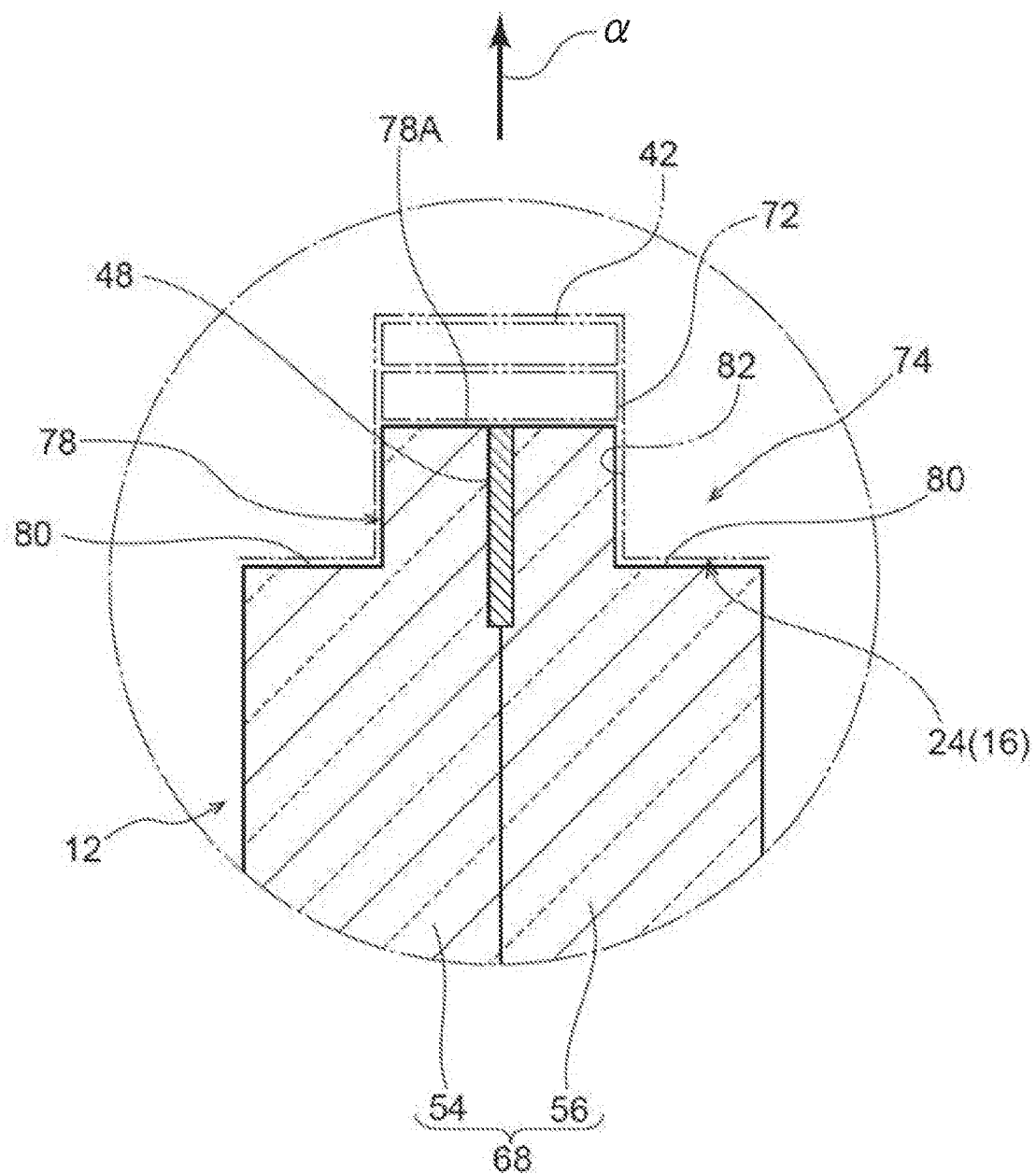
FIG. 6 is a sectional view along a line A-A of FIG. 5.

FIG. 6 illustrates a cross section of first fitting part 74 (a cross section of a portion provided with internal electrode 48) in a case where lens body 68 is cut along its thickness direction (in other words, along a virtual plane parallel to the normal direction and the thickness direction).

As illustrated in FIG. 6, first fitting part 74 has, at the center part in the thickness direction of lens body 68 (the lateral direction in FIG. 6), protruding part 78 (also referred to as exposed part) protruding in a direction orthogonal to the thickness direction of lens body 68 and a direction away from lens body 68 (a direction of arrow α).

In other words, the center part of first fitting part 74 in the thickness direction protrudes to one side in the normal direction more than both end parts (the right end part and the left end part in FIG. 6) of first fitting part 74 in the thickness direction. Specifically, first fitting part 74 has, at the center part in the thickness direction, protruding part 78 protruding to one side in the normal direction.

Note that protruding part 78 is formed by providing a pair of step parts 80 in a front-side portion and a rear-side portion on the outer periphery of lens body 68. In other words, protruding part 78 is formed by setting the thickness dimension of the outer periphery of lens body 68 to be smaller than the thickness dimension of the center portion of lens body 68.

Protruding part 78 continues over the whole length of first fitting part 74 along the outer edge of lens body 68 (the external shape of lens body 68 in a planar view from the front-rear direction). However, protruding part 78 may have a discontinuous portion in first fitting part 74.

Further, tip surface 78A of protruding part 78 in the protruding direction has a planar shape. The end part of internal electrode 48 is exposed on tip surface 78A. Note that in a portion provided in internal electrode 50 (see FIG. 5) in first fitting part 74 as well, the end part of internal electrode 50 is exposed on tip surface 78A of protruding part 78. Tip surface 78A does not need to be a perfect plane, but may have a substantially flat shape.

Figure 7:
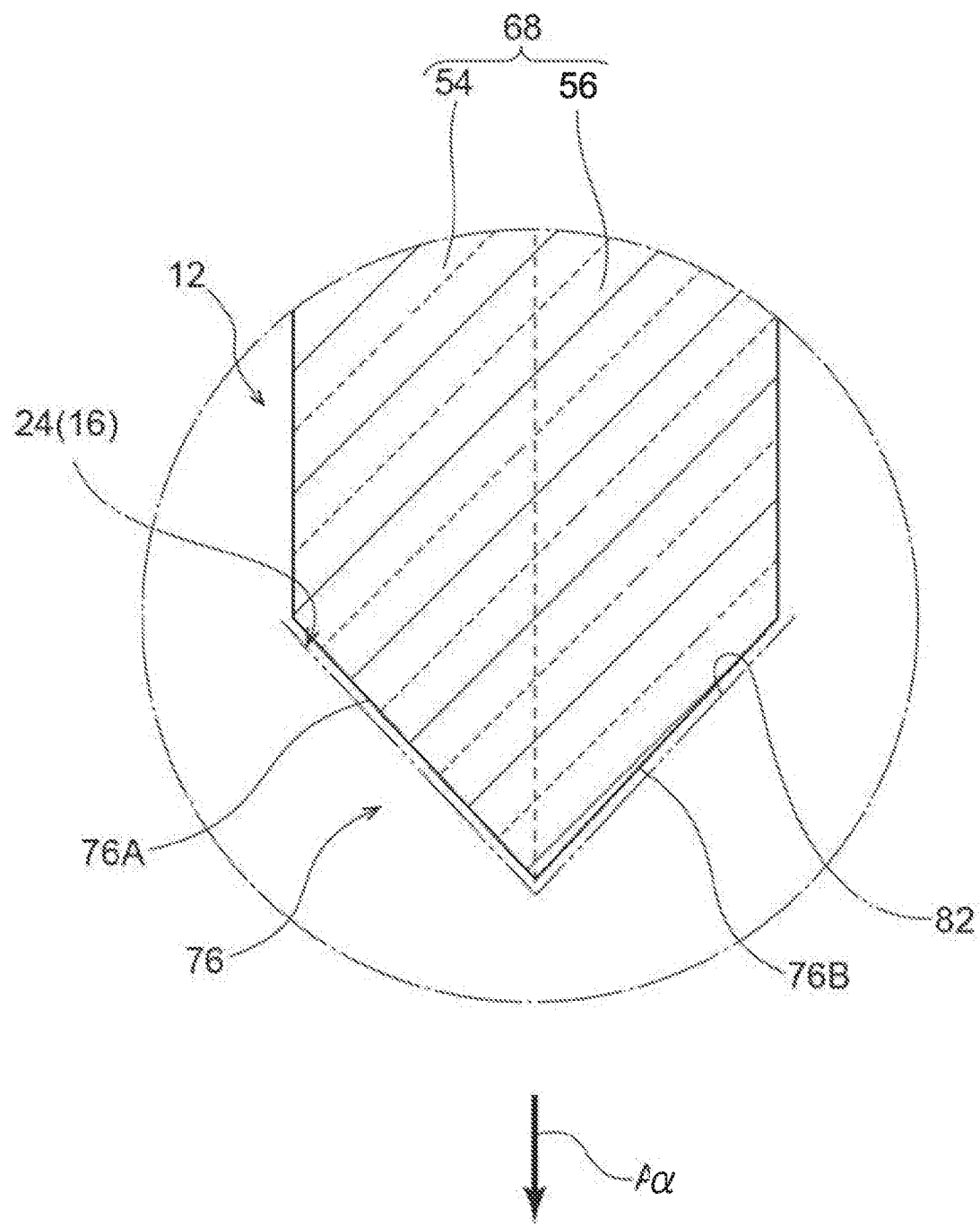
FIG. 7 is a sectional view along a line B-B of FIG. 5.

FIG. 7 illustrates a cross section of second fitting part 76 in a case where lens body 68 is cut along its thickness direction (in other words, along a virtual plane parallel to the normal direction and the thickness direction). As illustrated in FIG. 7, second fitting part 76 gradually becomes narrower as going in the direction orthogonal to the thickness direction of lens body 68 and the direction away from lens body 68 (a direction of arrow α).

In other words, second fitting part 76 becomes smaller in size (that is, narrower) in the thickness direction as going to one side in the normal direction (downward in FIG. 7). Second fitting part 76 is thereby formed into a V-groove shape.

Note that an inclined surface being the front surface of second fitting part 76 is referred to as front-side inclined surface 76A. Meanwhile, an inclined surface being the rear surface of second fitting part 76 is referred to as rear-side inclined surface 76B. Here, "groove" is a portion formed by processing the outer periphery of lens body 68 so that lenses 12, 14 are attached to frame 16 of the eyewear (electronic glasses 10 in the present embodiment).

The "V-groove shape" is a groove having a V-shaped tip shape. While the V-shaped tip shape can also be referred to as a tip shape with an acute angle, the shape may not necessarily have a perfect acute angle, but may only be a shape with an angle close to an acute angle. The V-shaped tip shape may be a tapering or triangular tip shape.

As described above, in the case of the present embodiment, first fitting part 74 and second fitting part 76 are different in the cross-sectional shape when cut along the virtual plane parallel to the normal direction and the thickness direction (that is, the shapes illustrated in FIGS. 6 and 7). In other words, first fitting part 74 and second fitting part 76 are different in the external shape in the cross-sectional shape described above. Note that the external shape may include the external shape of internal electrode 48 exposed externally from first fitting part 74.

As illustrated in FIGS. 6 and 7, each of first fitting part 74 and second fitting part 76 is fitted into fitting groove 82 formed on the inner periphery of left-side rim 24. In fitting groove 82 of left-side rim 24, a portion to which first fitting part 74 is fitted has a shape corresponding to the shape of first fitting part 74. Further, in fitting groove 82, a portion to which second fitting part 76 is fitted has a shape corresponding to the shape of second fitting part 76.

In the case of the present embodiment, with lens 12 held in left-side rim 24, dashed-dotted line L (see FIG. 5) being the boundary between first fitting part 74 and second fitting part 76 is disposed below bridge 26 or right-side temple 30 and left-side temple 32 (see FIG. 2). In other words, in the case of the present embodiment, second fitting part 76 formed in the V-groove shape is not disposed in the portion facing flexible cable 42.

That is, on the outer periphery of lens 12, at least the region on the upper side of the lens where the end parts of internal electrodes 48, 50 are exposed has protruding part 78. Among the upper side and the right and left sides of the lens, the region located above bridge 26 or right-side temple 30 and left-side temple 32 preferably has protruding part 78.

Meanwhile, on the outer periphery of lens 12, at least the region on the lower side of the lens has the V-groove shape. Among the lower side and the right and left sides of the lens, the region located below bridge 26 or right-side temple 30 and left-side temple 32 preferably has the V-groove shape.

As illustrated in FIG. 6, first fitting part 74 may at least have protruding part 78 with tip surface 78A in substantially planar shape and step parts 80 provided on each of the front-side portion and the rear-side portion of protruding part 78.

Hence the side surface of protruding part 78 that connects between tip surface 78A and step part 80 is not limited to the plane as illustrated, but may be a curved surface. An angle of contact between the side surface of protruding part 78 and tip surface 78A and an angle of contact between the side surface of protruding part 78 and step part 80 may not necessarily be a right angle. In addition, protruding part 78 can be expressed as a rectangular shape.

On the outer periphery of lens 12, at least the region including the region where the end parts of internal electrodes 48, 50 are exposed has protruding part 78 as illustrated in FIG. 6. Each of the end parts of internal electrodes 48, 50 are exposed on tip surface 78A having the planar shape in protruding part 78. Meanwhile, the region where the end parts of internal electrodes 48, 50 are not exposed has the V-groove shape as illustrated in FIG. 7.

With such a configuration, in the region where the end parts of internal electrodes 48, 50 are exposed, the end parts of internal electrodes 48, 50 are exposed in the region in a substantially planar shape (that is, tip surface 78A) on the outer periphery of lens 12. As a result, the contactability with the external electrode (flexible cable 42) in the region is improved. Meanwhile, the region where the end parts of internal electrodes 48, 50 are not exposed, with the outer periphery of lens 12 having the V-groove shape, electronic glasses 10 and the like are easily incorporated into the frame.

That is, on the outer periphery of lens 12, at least the region including the region where the end parts of internal electrodes 48, 50 are exposed has a planar portion at least on the outer periphery. Meanwhile, the region where the end parts of internal electrodes 48, 50 are not exposed has a portion in a sharp shape on the outer periphery.

In other words, on the outer periphery of lens 12, the planar region on the outer periphery (specifically, the thickness of lens 12 on the outer periphery) in the region where the end parts of internal electrodes 48, 50 are exposed is larger than that in the region where the end parts of internal electrodes 48, 50 are not exposed.

In other words, on the outer periphery of lens 12, the planar region on the outer periphery (specifically, the thickness of lens 12 on the outer periphery) in the region where the end parts of internal electrodes 48, 50 are not exposed is smaller than that in the region where the end parts of internal electrodes 48, 50 are exposed.

[Action and Effect of Present Embodiment]

Next, the action and effect of the present embodiment will be described.

The voltage is not applied to liquid crystal 18 in a state where the user is wearing electronic glasses 10 illustrated in FIGS. 1 and 2 and not operating switch 46. Here, the refractive index of liquid crystal 18 in the state of no voltage being applied is substantially the same as those of front lens 54 and diffraction-section including lens 56. Hence the power of the portion provided with diffraction section 60 in each of left and right lenses 12, 14 is substantially the same as the power of the portion except for diffraction section 60 in each of left and right lenses 12, 14.

When the voltage is applied to liquid crystal 18 in accordance with the operation of switch 46 by the user of electronic glasses 10, the arrangement of liquid crystal 18 is changed and the refractive index of liquid crystal 18 changes. Thereby, the power of the portion provided with diffraction section 60 in each of left and right lenses 12, 14 becomes higher than the power of the portion except for diffraction section 60 in each of left and right lenses 12, 14. In other words, the focal length of the portion provided with diffraction section 60 becomes shorter than the focal length of the portion except for diffraction section 60 in each of left and right lenses 12, 14.

As illustrated in FIGS. 5 to 7, in the case of electronic glasses 10 of the present embodiment, left-side lens 12 is attached to frame 16 by fitting of first fitting part 74 and second fitting part 76 of lens body 68 into fitting groove 82 of left-side rim 24 in frame 16.

Further, right-side lens 14 (see FIG. 2) is also attached to frame 16 by fitting of first fitting part 74 and second fitting part 76 of lens body 68 into fitting groove 82 of right-side rim 22 in frame 16.

As illustrated in FIGS. 6 and 7, in the present embodiment, the shape of first fitting part 74 and the shape of second fitting part 76 are different in lens body 68 of each of lenses 12, 14. That is, as illustrated in FIG. 6, first fitting part 74 has a shape to stabilize the state of contact between each of internal electrodes 48, 50 and conductive rubber 72.

Meanwhile, as illustrated in FIG. 7, second fitting part 76 has a shape to facilitate fitting into fitting groove 82 of each of the rims (right-side rim 22 and left-side rim 24) in frame 16. To be more specific, as illustrated in FIG. 6, tip surface 78A of protruding part 78 in first fitting part 74 has a planar shape. Such a configuration enables stable contact between internal electrodes 48, 50 and conductive rubber 72 in the portions where internal electrodes 48, 50 are exposed.

Further, as illustrated in FIG. 7, second fitting part 76 is fitted into fitting groove 82 of each of the rims (right-side rim 22 and left-side rim 24) by pushing and sliding front-side inclined surface 76A or rear-side inclined surface 76B of second fitting part 76 on each of the rims (right-side rim 22 and left-side rim 24) of frame 16. As described above, according to the present embodiment, it is possible to attach lenses 12, 14 to frame 16 while ensuring the state of contact between each of internal electrodes 48, 50 and conductive rubber 72.

In the present embodiment, the contact pressure between each of the end parts of internal electrodes 48, 50 and conductive rubber 72 can be made high due to exposure of each of the end parts of internal electrodes 48, 50 on tip surface 78A of protruding part 78. Such a configuration is effective for preventing a failure in contact between each of the end parts of internal electrodes 48, 50 and conductive rubber 72.

In the present embodiment, second fitting part 76 is in the V-groove shape having front-side inclined surface 76A and rear-side inclined surface 76B. With such a configuration, the operability in removing lenses 12, 14 from the rims (right-side rim 22 and left-side rim 24) of frame 16 can be made favorable.

In the present embodiment, second fitting part 76 having the V-groove shape is not disposed facing flexible cable 42. Such a configuration is effective for preventing flexible cable 42 from being damaged by the tip of second fitting part 76.

In the present embodiment, the example has been described where the present invention is applied to lenses 12, 14 that are attached to frame 16 having the annular rims (right-side rim 22 and left-side rim 24). However, an application object of the present invention is not limited thereto.

Figure 8:
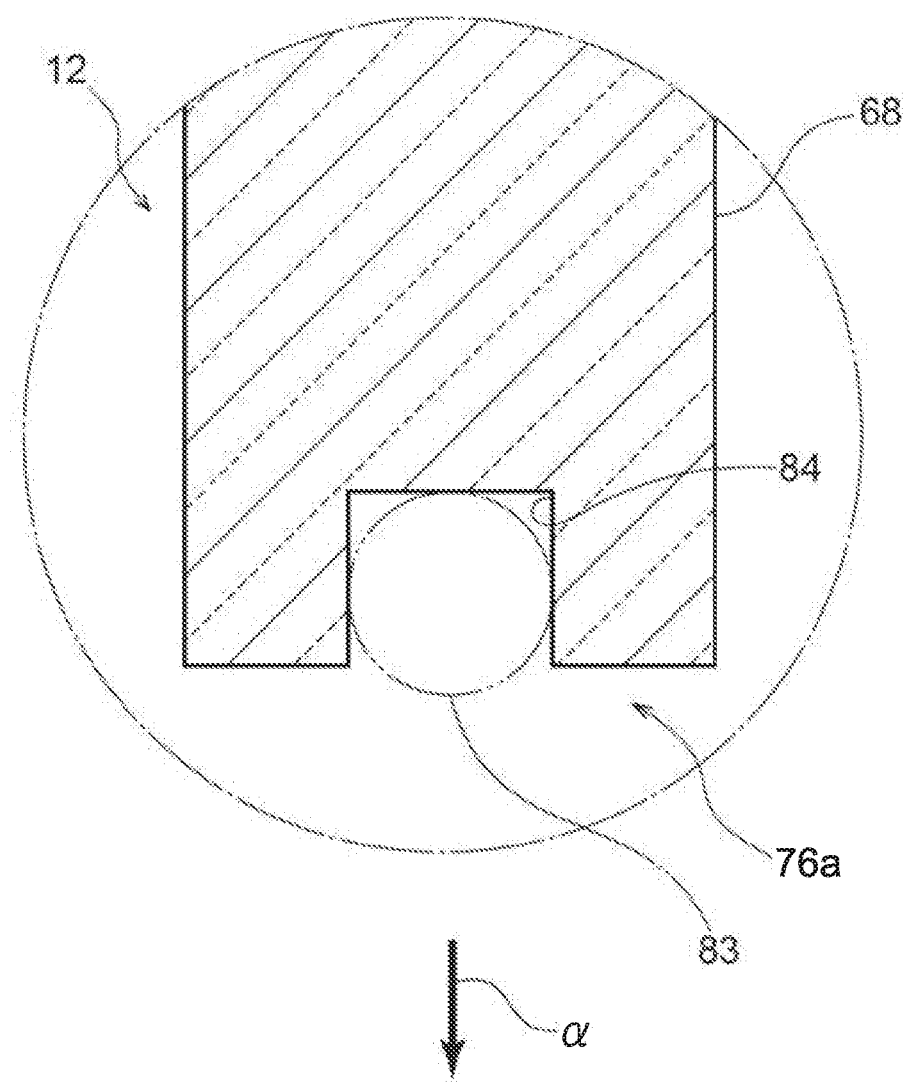
FIG. 8 is a sectional view illustrating Modification 1 of a second fitting part of the lens and corresponding to FIG. 7.

For example, as in Embodiment 2 described later, the present invention can also be applied to lenses 12, 14 that are attached to a frame having a rim only for the upper part of each of lenses 12, 14. FIG. 8 is a partial sectional view of second fitting part 76a, illustrating Modification 1 of the second fitting part. Second fitting part 76a has wire fitting groove 84 with a groove shape, into which wire 83 having both ends fixed to frame 16, is fitted. Note that wire 83 constitutes a part of frame 16.

In the present embodiment, the example has been described where protruding part 78 is formed in first fitting part 74 to increase the contact pressure between each of the end parts of internal electrodes 48, 50 and conductive rubber 72, but the present invention is not limited thereto.

Figure 9:
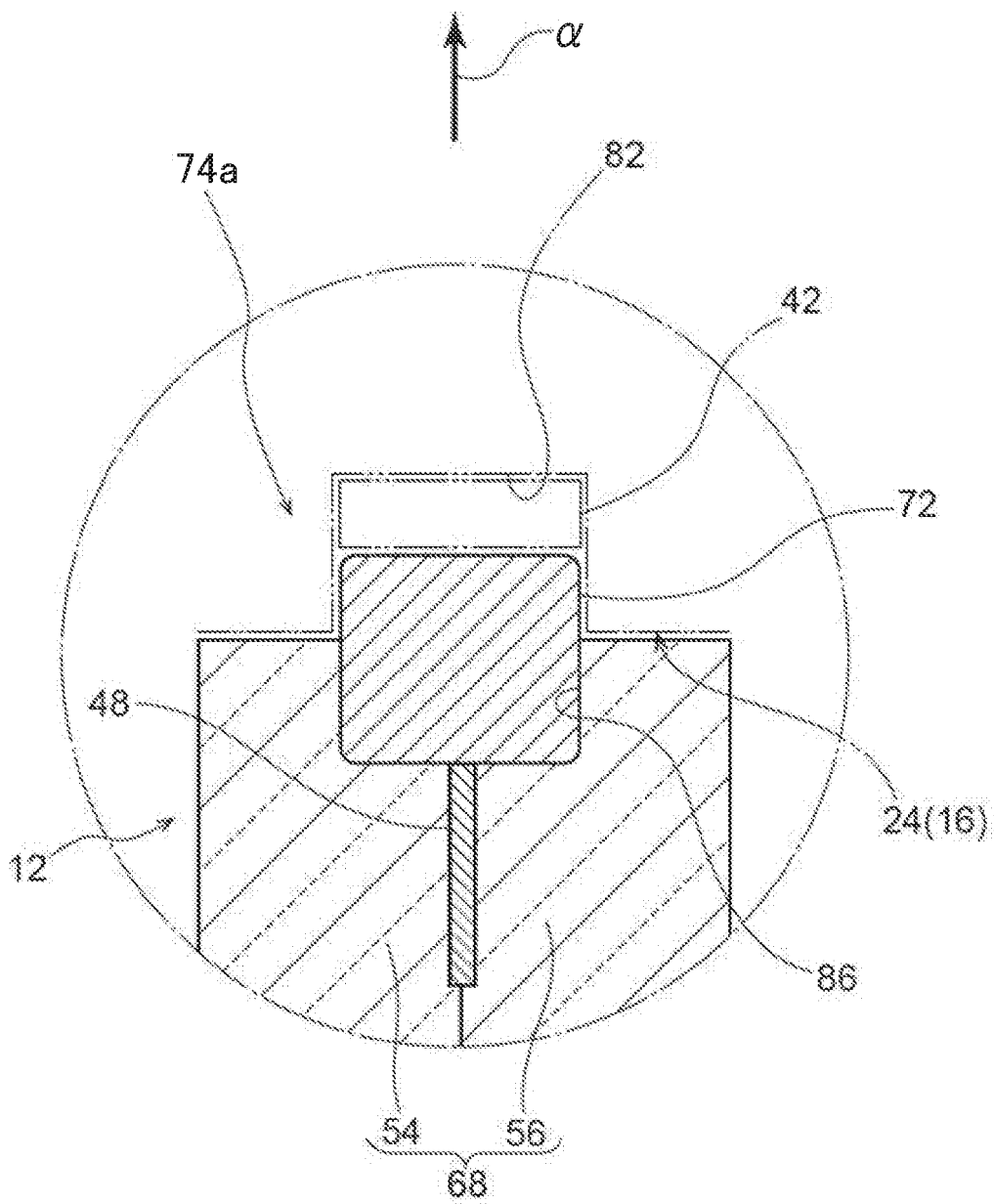
FIG. 9 is a sectional view illustrating Modification 1 of a first fitting part of the lens and corresponding to FIG. 6.

FIG. 9 is a partial sectional view of first fitting part 74*a*, illustrating Modification 1 of the first fitting part. On the outer periphery of lens 12, first fitting part 74*a* has groove-shaped rubber placement groove 86 (also referred to as exposed part) where conductive rubber 72 is to be disposed.

When such a configuration is employed, the contact pressure between each of the end parts of internal electrodes 48, 50 and conductive rubber 72 may be increased by setting conductive rubber 72 so as to be shrunk in rubber placement groove 86.

As illustrated in FIG. 6, in the present embodiment, the example has been described where protruding part 78 is formed in first fitting part 74 by providing step parts 80 with the same height in the front-side portion and the rear-side portion on the outer periphery of lens body 68. However, the present invention is not limited thereto.

Figure 10:
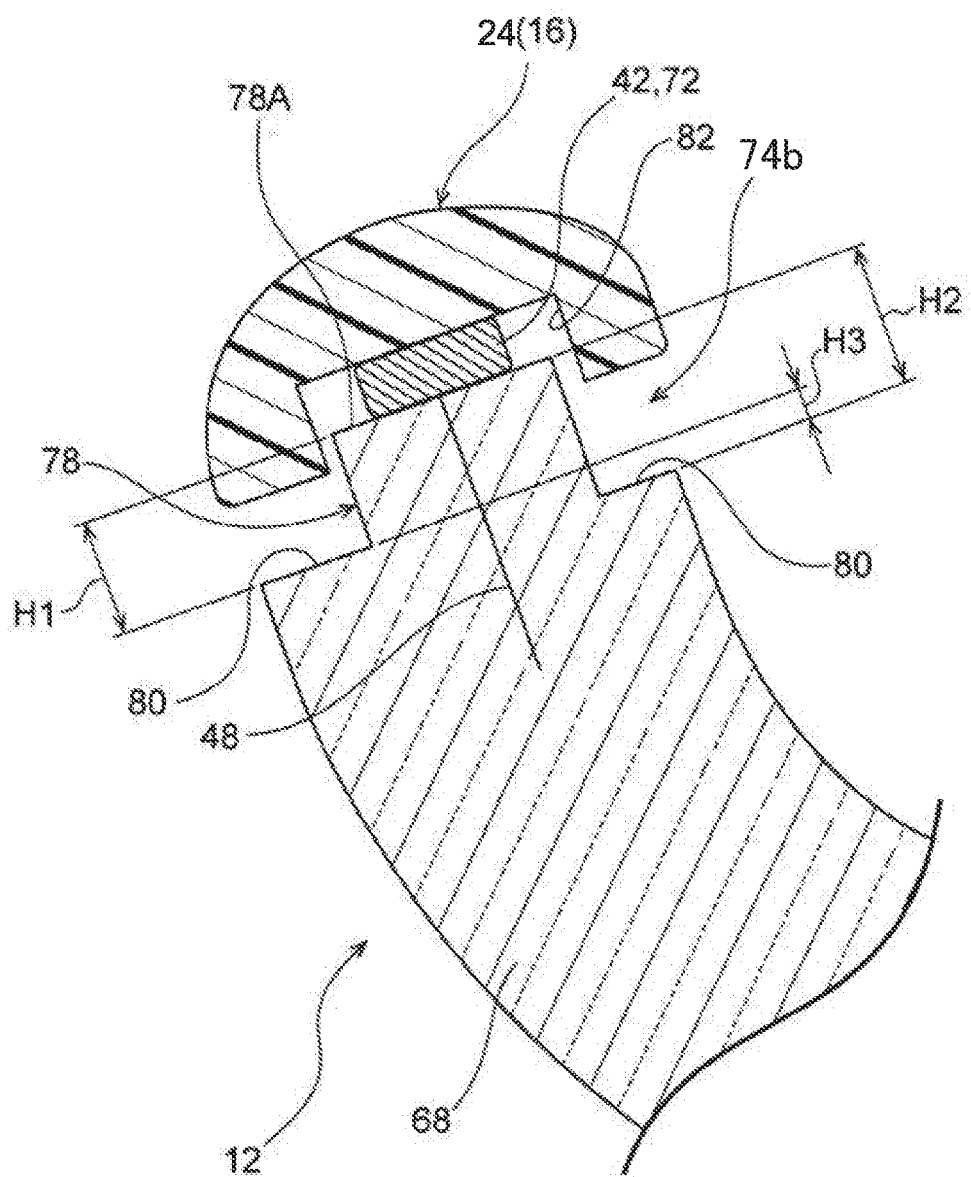
FIG. 10 is a sectional view illustrating Modification 2 of the first fitting part of the lens and corresponding to FIG. 6.

FIG. 10 is a partial sectional view of first fitting part 74*b*, illustrating Modification 2 of the first fitting part. In the case of first fitting part 74*b*, height H1 of step part 80 formed in the front-side portion on the outer periphery of lens body 68 is smaller than height H2 of step part 80 formed in the rear-side portion.

With such a configuration, on the front-surface side in the upper part of lens body 68, a gap formed between the rims (right-side rim 22 and left-side rim 24 of frame 16) can be made small. As an example, difference H3 between height H1 of step part 80 formed in the front-side portion on the outer periphery of lens body 68 and height H2 of step part 80 formed in the rear-side portion is approximately 0.2 mm. However, difference H3 may be larger than this.

Summary of Present Embodiment

The lens and the eyewear having the lens according Embodiment 1 described above include the following aspects:

[First Aspect]

A first aspect of the lens according to Embodiment 1 above is provided with: a lens body; and an internal electrode that is attached to the lens body, at least a part of the internal electrode being exposed in an outer edge part of the lens body. In the outer edge part of the lens body, a shape of a first region including an exposed part where the internal electrode is exposed and a shape of a second region not including the exposed part are different.

[Second Aspect]

A lens according to a second aspect is the lens according to the first aspect, in which the shape of the first region has a plane at a tip, and an end part of the internal electrode is exposed on the plane.

According to the lens of the second aspect, the state of contact between the external electrode and internal electrode can be made favorable.

[Third Aspect]

A lens according to a third aspect is the lens according to the first aspect, in which the shape of the second region is sharp at a tip.

According to the lens of the third aspect, it is possible to facilitate fitting of the second region of the lens body into the frame.

[Fourth Aspect]

A lens according to a fourth aspect is the lens according to the first aspect, in which the shape of the second region has a groove part at a tip.

According to the lens of the fourth aspect, the groove part is formed at the tip of the second region of the lens body, so that a wire is fitted into the groove part.

[Fifth Aspect]

A lens according to a fifth aspect is the lens according to the first aspect, in which a thickness of an end part of the lens body in the first region is larger than a thickness of an end part of the lens body in the second region as viewed in a cross section cut along a thickness direction of the lens body.

According to the lens of the fifth aspect, it is possible to easily fit the second region of the lens body into the frame.

[Sixth Aspect]

A lens according to a sixth aspect is the lens according to the second aspect, in which the first region has a protruding shape including the plane at the tip, and the shape of the second region is a V-shape.

According to the lens of the sixth aspect, it is possible to facilitate fitting of the second region of the lens body into the frame, while ensuring the state of contact between the external electrode and the internal electrode in the first region of the lens body.

[Seventh Aspect]

A lens according to a seventh aspect is the lens according to any one of the first to sixth aspects, in which an outer edge part on an upper side of the lens body is the first region, an outer edge part on a lower side of the lens body is the second region, and a boundary between the first region and the second region is located on each of right and left sides of the lens body.

According to the lens of the seventh aspect, the external electrode can be disposed along the upper side of the lens body.

[Eighth Aspect]

A lens according to an eighth aspect is the lens according to the seventh aspect, in which the boundary between the first region and the second region is located below a bridge or a temple of a frame of eyewear, with the lens body held in the frame.

According to the lens of the eighth aspect, the external electrode can be disposed along the upper part of the frame.

[Ninth Aspect]

A lens according to a ninth aspect is the lens according to any one of the first to eighth aspects, in which the lens body is held in the frame, the internal electrode is buried in the lens body and electrically in contact with an external electrode provided in the frame, the first region is a first fitting part that is fitted into the frame with the exposed part in contact with the external electrode, and the second region is a second fitting part that is connected to the first region and fitted into the frame.

According to the lens of the ninth aspect, it is possible to facilitate fitting of the second region of the lens body into the frame, while ensuring the state of contact between the external electrode provided in the frame and the internal electrode buried in the lens body in the first region of the lens body. That is, it is possible to easily fit the lens into the frame.

[Tenth Aspect]

A lens according to a tenth aspect is the lens according to the first aspect, in which at least a thickness dimension of the exposed part in the first region is different from a thickness dimension of a center portion of the lens body as viewed in a cross section cut along a thickness direction of the lens body.

According to the lens of the tenth aspect, the contact pressure between the internal electrode and the external electrode can be made high.

[Eleventh Aspect]

A lens according to an eleventh aspect is the lens according to the tenth aspect, in which at least the thickness dimension of the exposed part in the first region is set to be smaller than the thickness dimension of the center portion of the lens body as viewed in a cross section cut along the thickness direction of the lens body.

According to the lens of the eleventh aspect, the contact pressure between the internal electrode and the external electrode can be made high.

[Twelfth Aspect]

Eyewear according to a twelfth aspect is provided with: the lens according to any one of the first to eleventh aspects; a frame including a lens holder by which the lens is held, the frame being a portion to be worn by a user; and an external electrode disposed between the lens holder and the lens.

According to the eyewear of the twelfth aspect, it is possible to facilitate fitting of the second region of the lens body into the frame, while ensuring the state of contact between the internal electrode and the external electrode in the first region of the lens body.

[Thirteenth Aspect]

Eyewear according to a thirteenth aspect is the eyewear according to the twelfth aspect, in which a conductive rubber is disposed between the exposed part and the external electrode.

According to the eyewear of the thirteenth aspect, the internal electrode and the external electrode provided in the lens body can be connected via the conductive rubber.

While one embodiment of the present invention has been described above, the present invention is not limited to the configuration described above, but can naturally be performed in a configuration other than the configuration described above by being subjected to various modification within a range not deviating from the gist of the invention.

Embodiment 2

Figure 11:
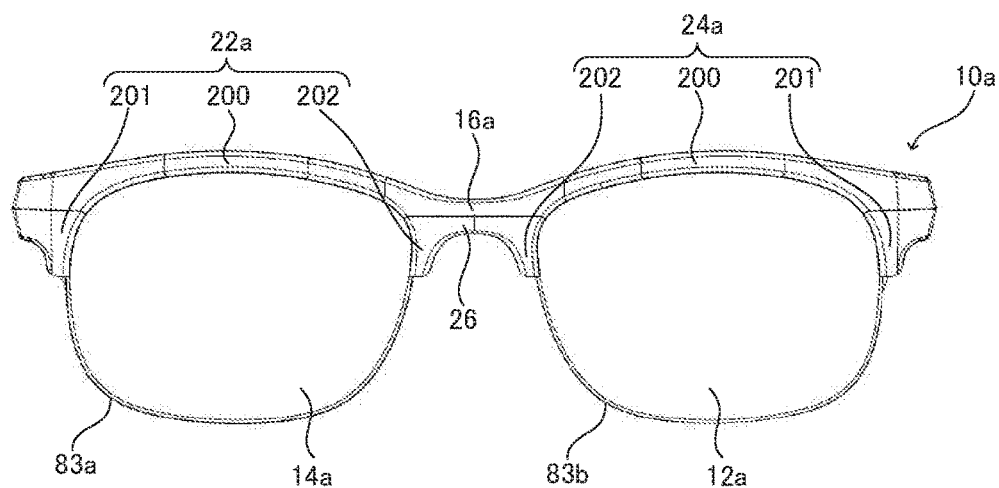
FIG. 11 is a front view of electronic glasses of Embodiment 2 according to the present invention.

Embodiment 2 according to the present invention will be described with reference to FIGS. 11 to 12E. Electronic glasses 10a of the present embodiment is different from electronic glasses 10 of Embodiment 1 described above (see FIGS. 1 and 7) in configurations of frame 16a, second fitting parts 76b to 76f in each of lenses 12a, 14a.

The other configurations of electronic glasses 10a are similar to those in Embodiment 1 described above. Therefore, in the following, electronic glasses 10a according to the present embodiment will be described with a focus on the configurations different from those in Embodiment 1 described above. In the present embodiment, for a similar configuration to that in Embodiment 1, the description of Embodiment 1 above can be cited as appropriate.

In the case of the present embodiment, frame 16a is a so-called half rim type frame, having right-side rim 22a, left-side rim 24a, right-side wire 83a, left-side wire 83b, bridge 26, right-side temple 30 (see FIG. 1), and left-side temple 32 (see FIG. 2). The configurations of bridge 26, right-side temple 30, and left-side temple 32 are similar to the case of Embodiment 1 described above.

Each of right-side rim 22a (the right-side rim seen from a user of electronic glasses 10a) and left-side rim 24a has a partial annular shape in a front view (seen from the front side of the user of electronic glasses 10a). That is, right-side rim 22a (left-side rim 24a) holds a part of the outer periphery of lens 14a (lens 12a).

Specifically, right-side rim 22a (left-side rim 24a) holds a part of the outer periphery of lens 14a (12a) including either the upper part on the outer periphery of lens 14a (12a) (hereinafter simply referred to as outer peripheral upper part) or the lower part thereon (hereinafter simply referred to as outer peripheral lower part) (in the case of FIG. 11, including the outer peripheral upper part).

In the present embodiment, right-side rim 22a and left-side rim 24a are in a symmetrical relation, and hence a specific structure of right-side rim 22a will be described below. For left-side rim 24a, the description of right-side rim 22a can be cited as appropriate.

Right-side rim 22a has upper rim element 200, first side rim element 201, and second side rim element 202. Upper rim element 200 (also referred to as first rim element) holds the outer peripheral upper parts of lenses 12a, 14a. Upper rim element 200 extends in the width direction (the lateral direction in FIG. 11) along the outer peripheral upper part of each of lenses 12a, 14a.

First side rim element 201 (also referred to as second rim element) holds an outer periphery of a portion of each of lenses 12a, 14a in a front view, the portion being on the outer side in the width direction (the lateral direction in FIG. 11) and closer to the upper end (also referred to as first outer peripheral side part). First side rim element 201 extends in the vertical direction (the vertical direction in FIG. 11) along the first outer peripheral side parts of lenses 12a, 14a.

One end of first side rim element 201 (the upper end in the case of the present embodiment) continues to the outer-side end part of upper rim element 200 in the width direction. Meanwhile, one end of right-side wire 83a, described later, is fixed to the other end (the lower end in the case of the present embodiment) of first side rim element 201.

Second side rim element 202 (also referred to as third rim element) holds an outer periphery of a portion of each of lenses 12a, 14a, the portion being on the inner side in the width direction and closer to the upper end (also referred to as second outer peripheral side part). Second side rim element 202 extends in the vertical direction (the vertical direction in FIG. 11) along the second outer peripheral side part of each of lenses 12a, 14a.

One end (the upper end in the case of the present embodiment) of second side rim element 202 continues to the inner-side end part of upper rim element 200 in the width direction. Meanwhile, the other end of right-side wire 83a, described later, is fixed to the other end (the lower end in the case of the present embodiment) of second side rim element 202.

Right-side rim 22a has fitting groove 82 (see FIG. 6) on the inner surface (the surface facing the outer periphery of lens 14a). The configuration of fitting groove 82 is similar to that in Embodiment 1 described above.

Both ends of right-side wire 83a are fixed to right-side rim 22a. Specifically, one end (the left-side end part of FIG. 11) of right-side wire 83a is fixed to one end (the left-side end part of FIG. 11) of right-side rim 22a. In the case of the present embodiment, one end (the left-side end part of FIG. 11) of right-side wire 83a is fixed to the other end of first side rim element 201 of right-side rim 22a.

Meanwhile, the other end (the right-side end part of FIG. 11) of right-side wire 83a is fixed to the other end (the right-side end part in FIG. 11) of right-side rim 22a. In the case of the present embodiment, the other end of right-side wire 83a is fixed to the other end of second side rim element 202 of right-side rim 22a. Right-side rim 22a and right-side wire 83a are configured into an annular shape along the external shape of lens 14a in a planar view from the front-rear direction. Since left-side wire 83b is symmetrical to right-side wire 83a, a specific description of left-side wire 83b will be omitted.

Next, a pair of left and right lenses 12a, 14a will be described. The basic structures of a pair of left and right lenses 12a, 14a are similar to those in Embodiment 1 described above. Further, since left-side lens 12a and right-side lens 14a are symmetrical, right-side lens 14a will be described below.

In lens 14a, at least the shape of outer periphery held by upper rim element 200 is different from the shape of the outer periphery held by right-side wire 83a. In the case of the present embodiment, in lens 14a, the shape of the outer periphery held by right-side rim 22a (upper rim element 200, first side rim element 201, and second side rim element 202) is different from the shape of the outer periphery held by right-side wire 83a.

Specifically, lens 14a has first fitting part 74 (also referred to as first region) in a portion held by right-side rim 22a on the outer periphery. First fitting part 74 is similar to that in an Embodiment 1 described above. Meanwhile, lens 14a has second fitting part 76b (also referred to as second region) in a portion held by right-side wire 83a (in other words, a portion not held by right-side rim 22a) on the outer periphery.

Second fitting part 76b is similar to second fitting part 76a illustrated in FIG. 8. Hereinafter, second fitting part 76b according to the present embodiment will be described with reference to FIG. 12A.

First, summaries of second fitting part 76b illustrated in FIG. 12A, and second fitting parts 76c to 76f illustrated in FIGS. 12B to 12E which are modifications of second fitting part 76b will be described.

Any of second fitting parts 76b to 76f has a recess and a protrusion alternately arranged in the thickness direction in a cross-sectional shape in the case of being cut along a virtual plane parallel to the normal direction and the thickness direction. The number of each of recesses and protrusions may be one, or two or larger. The recess constitutes each of wire fitting grooves 84 to 84c and wire fitting notch 87, described later. Meanwhile, the tip surface of the protrusion constitutes each of protrusions 85a to 85c described later. Note that the tip surface of the protrusion is preferably a flat surface. However, the tip surface of the protrusion may be an inclined surface or a curved surface.

Figure 12A:
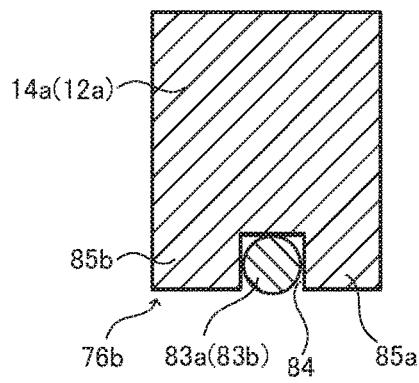
FIG. 12A is a sectional schematic view of a second fitting part according to Embodiment 2.

FIG. 12A is a sectional schematic view in a case where a portion of lens 14a where second fitting part 76b is disposed is cut along a virtual plane parallel to the normal direction and the thickness direction.

Second fitting part 76b has wire fitting groove 84 in an intermediate part in the thickness direction (the lateral direction in FIG. 12A) which is recessed to the other side in the normal direction (upward in FIG. 12A) more than both end parts in the thickness direction. In the case of the present embodiment, wire fitting groove 84 is provided at the center of second fitting part 76b in the thickness direction.

Wire fitting groove 84 has a rectangular cross-sectional shape when cut along a virtual plane parallel to the normal direction and the thickness direction. Wire fitting groove 84 continues over the whole length of second fitting part 76b.

Second fitting part 76b has a pair of protrusions 85a, 85b, the tips of which are flat surfaces, in positions sandwiching wire fitting groove 84 from the front-rear direction. The pair of protrusions 85a, 85b continue over the whole length of second fitting part 76b.

Right-side wire 83a is fitted into wire fitting groove 84 of second fitting part 76b having such a configuration as above. Meanwhile, as illustrated in FIG. 6, first fitting part 74 is fitted into fitting groove 82 formed on the inner periphery of right-side rim 22a. In this manner, lens 14a is held in right-side rim 22a and right-side wire 83a.

Hereinafter, Modifications 1 to 4 of second fitting part 76b according to Embodiment 2 will be described with reference to FIGS. 12B to 12E.

Figure 12B:
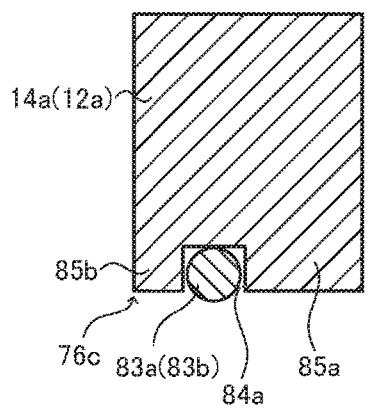
FIG. 12B is a sectional schematic view of Modification 1 of the second fitting part according to Embodiment 2.

FIG. 12B is a sectional schematic view of Modification 1 of the second fitting part. Second fitting part 76c has wire fitting groove 84a at a position in an intermediate part in the thickness direction (the lateral direction in FIG. 12B), the position being shifted from the center part to one side in the thickness direction (the left side in FIG. 12B). Wire fitting groove 84a has a groove shape recessed to the other side in the normal direction (upward in FIG. 12B).

Wire fitting groove 84a has a rectangular cross-sectional shape when cut along a virtual plane parallel to the normal direction and the thickness direction. Note that second fitting part 76c may have wire fitting groove 84a at a position in an intermediate part in the thickness direction (the lateral direction in FIG. 12B), the position being shifted from the center part to one side in the thickness direction (the right side in FIG. 12B).

Right-side wire 83a or left-side wire 83b is fitted into wire fitting groove 84a as described above. The other configuration of second fitting part 76c is similar to that of second fitting part 76b in Embodiment 2 above.

Figure 12C:
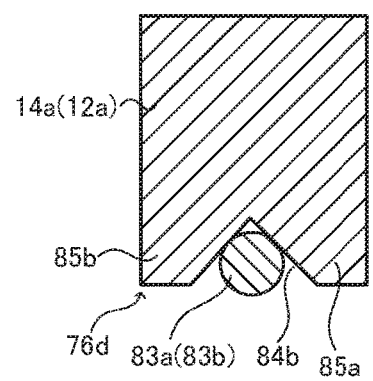
FIG. 12C is a sectional schematic view of Modification 2 of the second fitting part according to Embodiment 2.

FIG. 12C is a sectional schematic view of Modification 2 of the second fitting part. Second fitting part 76d has wire fitting groove 84b in an intermediate part (the center part in the case of the illustration) in the thickness direction (the lateral direction in FIG. 12C). Wire fitting groove 84b has a groove shape recessed to the other side in the normal direction (upward in FIG. 12C). Specifically, wire fitting groove 84b has a triangular cross-sectional shape when cut along a virtual plane parallel to the normal direction and the thickness direction.

In the above cross-sectional shape, wire fitting groove 84b has a smaller dimension in the thickness direction (the lateral direction in FIG. 12C) as going away from an opening (as going upward in FIG. 12C). Right-side wire 83a or left-side wire 83b is fitted into wire fitting groove 84b as described above. The other configuration of second fitting part 76d is similar to that of second fitting part 76b in Embodiment 2 above.

Figure 12D:
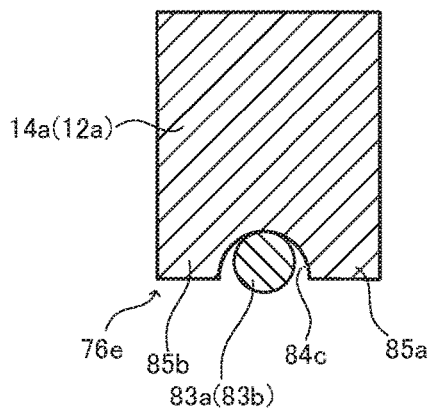
FIG. 12D is a sectional schematic view of Modification 3 of the second fitting part according to Embodiment 2.

FIG. 12D is a sectional schematic view of Modification 3 of the second fitting part. Second fitting part 76e has wire fitting groove 84c in an intermediate part (the center part in the case of the illustration) in the thickness direction (the lateral direction in FIG. 12D). Wire fitting groove 84c has a groove shape recessed to the other side in the normal direction (upward in FIG. 12D). Specifically, wire fitting groove 84c has a semicircular cross-sectional shape when cut along a virtual plane parallel to the normal direction and the thickness direction. Note that the cross-sectional shape of wire fitting groove 84c is not limited to a semicircle. The cross-sectional shape of wire fitting groove 84c may be formed using a curved line other than the semicircle. Alternatively, the cross-sectional shape of wire fitting groove 84c may be formed using a combination of curved and straight lines.

In the above cross-sectional shape, wire fitting groove 84c has a smaller dimension in the thickness direction (the lateral direction in FIG. 12D) as going away from an opening (as going upward in FIG. 12D). Right-side wire 83a or left-side wire 83b is fitted into wire fitting groove 84c as described above. The other configuration of second fitting part 76e is similar to that of second fitting part 76b in Embodiment 2 above.

Figure 12E:
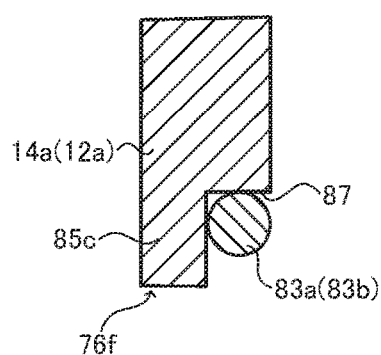
FIG. 12E is a sectional schematic view of Modification 4 of the second fitting part according to Embodiment 2.

FIG. 12E is a sectional schematic view of Modification 4 of the second fitting part. Second fitting part 76f has wire fitting notch 87 recessed to the other side in the normal direction (upward in FIG. 12E) more than one half part (a left-half part in FIG. 12E) in the other half part (a right-half part in FIG. 12E) in the thickness direction (the lateral direction in FIG. 12E).

Conversely, second fitting part 76f has, in the other half part (the left-half part of FIG. 12E) in the thickness direction, protrusion 85c protruding to one side in the normal direction more than one half part and having a flat surface at the tip.

In the case of the present embodiment, one half part in the thickness direction is one of a front-half part and a rear-half part in second fitting part 76f. On the other hand, the other half part in the thickness direction is the other of the front-half part and the rear-half part in second fitting part 76f. Note that the dimension of second fitting part 76f in the thickness direction (the lateral direction in FIG. 12E) may only be a dimension by which right-side wire 83a or left-side wire 83b can be fitted.

Wire fitting notch 87 has a rectangular cross-sectional shape when cut along a virtual plane parallel to the normal direction and the thickness direction. Right-side wire 83a or left-side wire 83b is fitted into wire fitting notch 87 described above.

[Appendix]

Although not illustrated, as Modification 1 of frame 16a according to Embodiment 2, each of the right-side rim and the left-side rim may have a lower rim element (also referred to as first rim element) to hold the outer peripheral lower part of each of lenses 14a, 12a in place of upper rim elements 200. In this case, side rim elements (also referred to as second rim element and third rim element) corresponding to first side rim element 201 and second side rim element 202 described above may be provided as appropriate.

As Modification 2 of frame 16a according to Embodiment 2, a configuration with right-side wire 83a and left-side wire 83b omitted therefrom may be employed. In this case, lenses 14a, 12a are fixed to right-side wire 83a and left-side wire 83b with fastening parts (for example, screws). For this reason, second fitting part 76b described above can be omitted.

Embodiment 3

Embodiment 3 according to the present invention will be described below. First, how the configuration of the present embodiment has been achieved will be described. PTL 1 described above discloses the lens of eyewear. In this lens, a focal length of a part of region can be changed based on energization of an electrode provided in the lens. This enables a user of eyewear provided with such a lens as described above to favorably view a thing disposed near the user through the above part of the region (that is, in a magnified view). In such a lens, the electrode desirably does not disturb the field of view from the viewpoint of improving the visibility. Accordingly, the present inventors have devised the configuration of the present embodiment for the purpose of providing a lens, a lens blank, and eyewear that can improve the visibility while preventing an electrode from disturbing the field of view.

Hereinafter, electronic glasses 10b as eyewear according to the present embodiment will be described with reference to FIGS. 13 to 16. Note that a basic configuration of electronic glasses 10b is similar to that of electronic glasses 10 of Embodiment 1 which has been described with reference to FIGS. 1 and 2. Thus, for description of portions similar to those in Embodiment 1, numerals similar to those in FIGS. 1 and 2 will be used.

Figure 13:
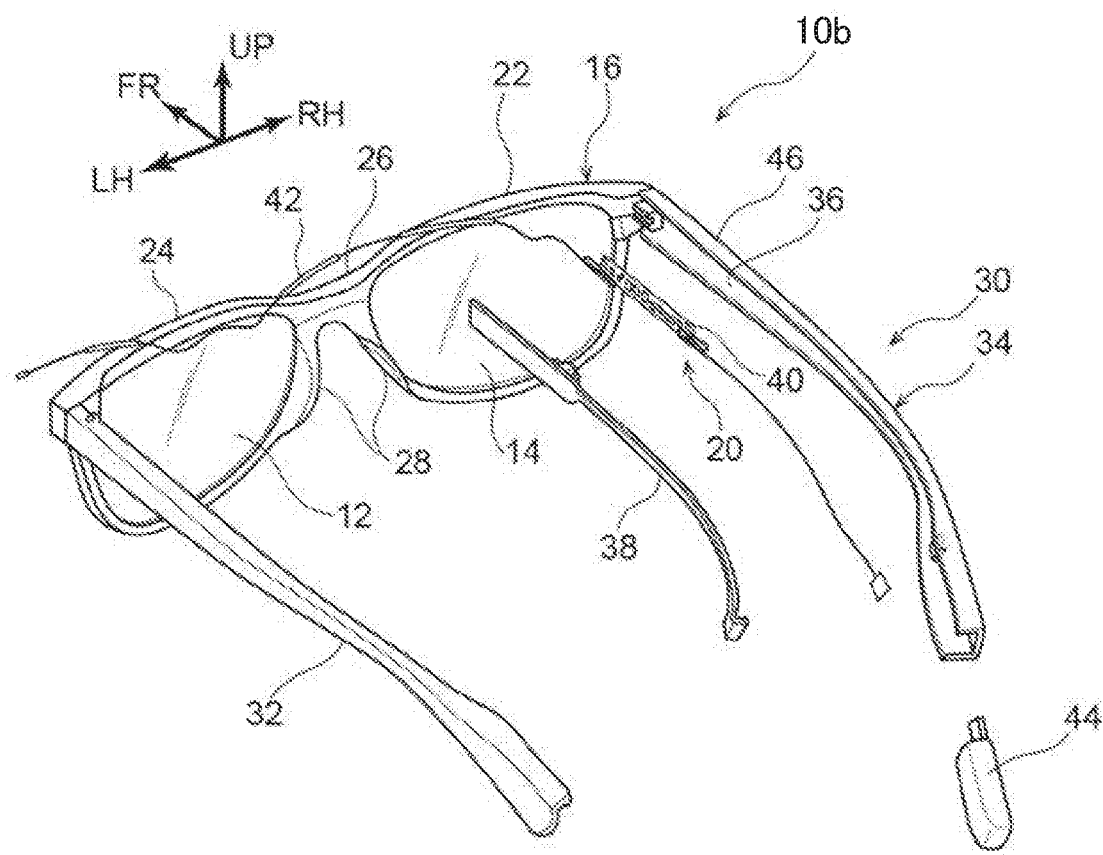
FIG. 13 is an exploded perspective view illustrating exploded electronic glasses of Embodiment 3 according to the present invention.
Figure 14:
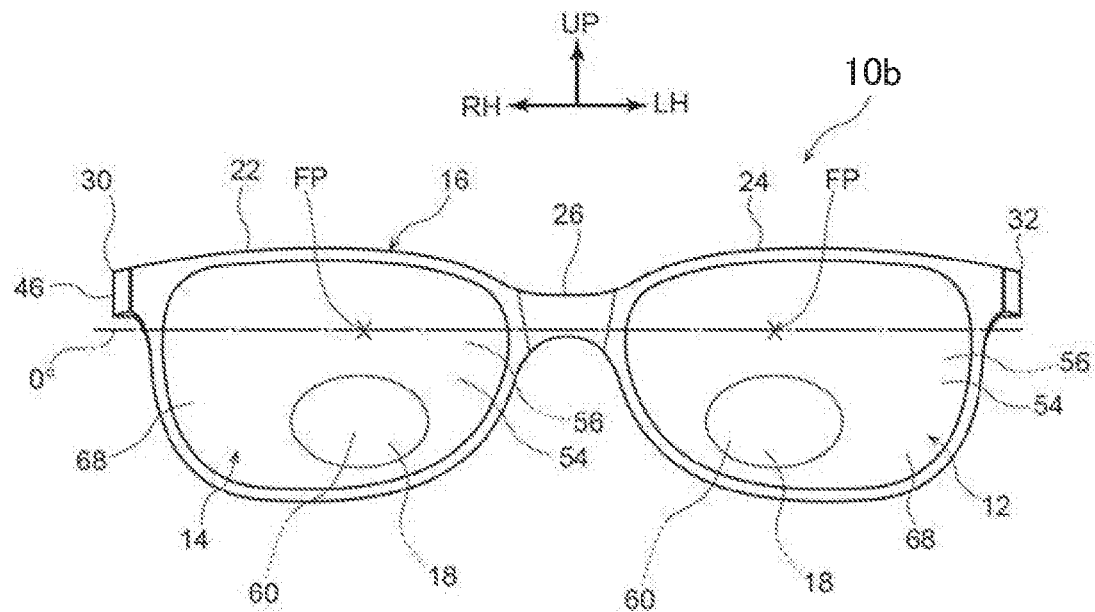
FIG. 14 is a front view illustrating the electronic glasses of Embodiment 3 according to the present invention.

As illustrated in FIGS. 13 and 14, in electronic glasses 10b of the present embodiment, a focal length (power) can be changed in a part of each of left and right lenses 12, 14 by a switching operation of the user. Specifically, electronic glasses 10b are provided with frame 16 to be worn by the user, a pair of left and right lenses 12, 14 held in frame 16, and liquid crystal driver 20 that drives liquid crystal 18 provided in lenses 12, 14.

Frame 16 has right-side rim 22, left-side rim 24, and bridge 26. Right-side rim 22 and left-side rim 24 hold right-side lens 14 and left-side lens 12, respectively. Right-side rim 22 and left-side rim 24 each have an annular shape in a front view (seen from the front side of a user of electronic glasses 10b).

Bridge 26 links between right-side rim 22 and left-side rim 24 in the lateral direction. Frame 16 has pad parts 28, to be fitted onto the nose of the user, in portions of right-side rim 22 and left-side rim 24, the portions being adjacent to bridge 26.

Frame 16 is provided with right-side temple 30 attached to a right-side end part of right-side rim 22 so as to be movable in an inclined manner, and left-side temple 32 attached to a left-side end part of left-side rim 24 so as to be movable in an inclined manner.

As illustrated in FIG. 13, right-side temple 30 has right-side temple body 34 and lid part 38. Right-side temple body 34 has groove part 36 with the user side (also referred to as the inner side in the width direction) opened. Lid part 38 is attached to right-side temple body 34 to close groove part 36.

Liquid crystal driver 20 changes the arrangement of liquid crystal 18 provided in each of lenses 12, 14 described later. Liquid crystal driver 20 has control module 40, flexible cable 42, battery 44, and switch 46. Each of flexible cable 42, battery 44, and switch 46 is connected to control module 40.

Control module 40 is disposed in groove part 36 of right-side temple body 34. Control module 40 is not exposed to the user side in a state where lid part 38 is attached to right-side temple body 34. Switch 46 is fixed to the opposite side of right-side temple body 34 from the user (the outer side in the width direction, and the side opposite to the side where groove part 36 is formed).

Note that switch 46 of the present embodiment is a capacitive touch switch that is operable by the user's touch. Battery 44 is removably attached to a rear end part of right-side temple 30.

Flexible cable 42 is provided from control module 40, disposed in right-side temple 30, extending to an upper-side portion of right-side rim 22, bridge 26, and upper-side portion of left-side rim 24.

Then, right-side lens 14 and left-side lens 12 are fixed to (mounted into) right-side rim 22 and left-side rim 24, respectively. In this state, flexible cable 42 and internal electrodes 48, 50 (see FIG. 15) are connected electrically.

Inside each of lenses 12, 14, a pair of conductive films (not illustrated) are arranged so as to sandwich liquid crystal 18 therebetween in the direction of axis FR. Internal electrodes 48, 50 are electrically connected to one and the other of the pair of conductive films, respectively.

When a voltage is applied to internal electrodes 48, 50, the voltage is applied across the pair of conductive films. The orientation of liquid crystal 18 is controlled by an electric field generated due to the application of the voltage across the conductive films. For example, when cholesteric liquid crystal is employed as liquid crystal 18, a refractive index of liquid crystal 18 is controlled by controlling the voltage across internal electrodes 48 and 50.

Next, lenses 12, 14 being main parts of the present embodiment will be described. Note that right-side lens 14 and left-side lens 12 are formed to be symmetrical. Therefore, in the following, left-side lens 12 will be described, and for each part of right-side lens 14, the same numeral as that of left-side lens 12 will be provided and the description of right-side lens 14 will be omitted.

Figure 15:
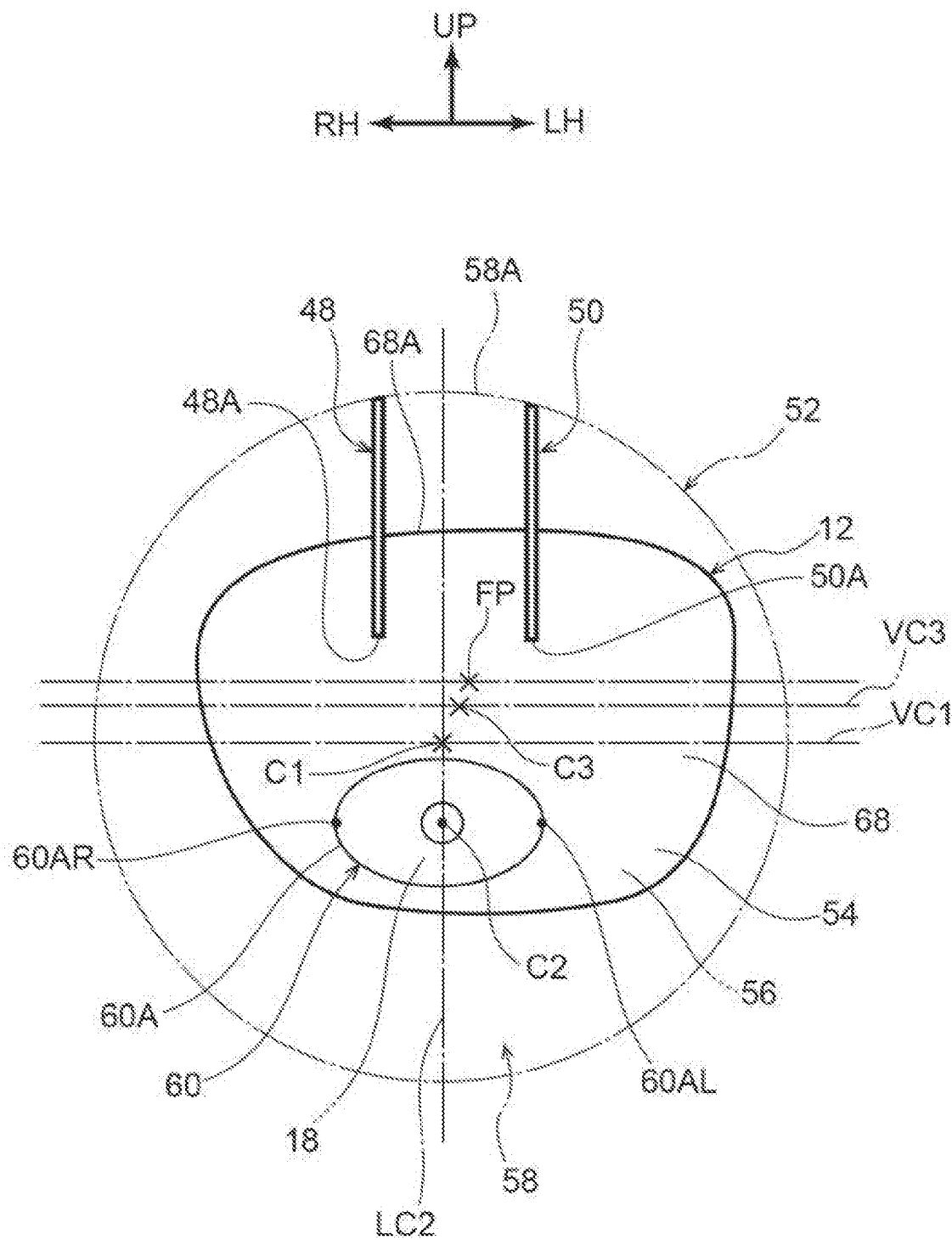
FIG. 15 is a front view illustrating a lens and a lens blank according to Embodiment 3.

As illustrated in FIG. 15, lens 12 is obtained by processing lens blank 52 into a shape corresponding to the shape of left-side rim 24 (see FIG. 13). The external shape of lens blank 52 in a front view is a circular shape, for example. Note that the center (gravity center) of lens blank 52 as seen from the front (thickness direction) is referred to as blank center C1.

Lens blank 52 is provided with blank body 58. Blank body 58 has front lens 54 and diffraction-section including lens 56 that are superimposed and joined in the thickness direction. Each of front lens 54 and diffraction-section including lens 56 is gently curved so as to form a shape protruding forward.

In addition, front lens 54 and a portion of diffraction-section including lens 56, the portion being except for a portion provided with diffraction section 60 (see FIG. 14), are joined via an adhesive layer (not illustrated). Note that internal electrodes 48, 50 described later are buried in this adhesive layer. The configuration of lens body 68 of lens 12, cut out of lens blank 52, corresponds to the configuration of blank body 58 of lens blank 52.

Diffraction-section including lens 56 has, in a part thereof, diffraction section 60 constituting an electroactive section and a part of a focal-length changing section. Diffraction section 60 has a configuration of a so-called Fresnel lens that has a saw-blade shape in a cross section on the front lens 54 side (front side).

Diffraction section 60 is disposed below blank center C1. In diffraction section 60, outer edge 60A in a front view has an elliptical shape with the lateral direction taken as a longitudinal direction. Note that the center (gravity center) of diffraction section 60 is referred to as diffraction-section center C2.

A line passing through diffraction-section center C2 and extending in the vertical direction is diffraction-section center line LC2. Diffraction-section center line LC2 is also the center line of electroactive section and the center line of focal-length changing section. In the present embodiment, diffraction-section center line LC2 passes through blank center C1.

Figure 16:
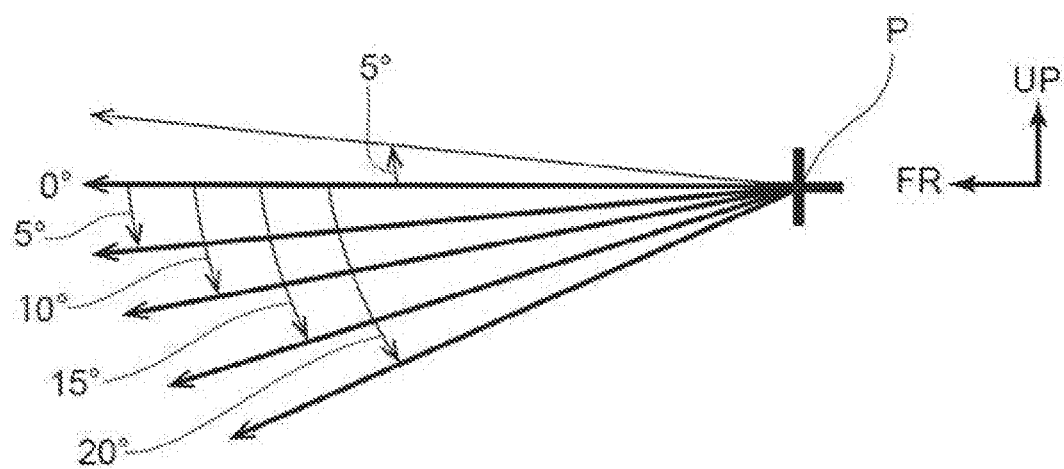
FIG. 16 is an explanatory diagram for explaining a line of sight of a user wearing the electronic glasses.

Here, as illustrated in FIG. 14, the position and the range of diffraction section 60 are set considering fitting point FP of the user of electronic glasses 10b. As illustrated in FIGS. 14 and 16, fitting point FP is a point at which pupil P of the user of electronic glasses 10b is located when the user with his or her line of sight matched with the front in the horizontal direction (vertical 0-degree direction) is seen from the front side.

Generally, the position of pupil P in a long-distance view and the position of pupil P in a short-distance view are different. In the present embodiment, the position of diffraction section 60 with respect to lens body 68 is set so that the user can view an object through diffraction section 60 in a short-distance view.

As illustrated in FIGS. 15 and 16, the position and the range of diffraction section 60 are set so that the user of electronic glasses 10b can view the object through diffraction section 60 at the time of vertically moving the line of sight downward in the range of 10 to 20 degrees from the horizontal direction (0-degree direction).

For example, the position of diffraction-section center C2 of diffraction section 60 is set at a position 9.5 mm vertically down from the fitting point and a position 2 to 2.5 mm horizontally from the fitting point.

Generally, when the user shifts pupil P vertically downward to see a short-distance sight, the position of pupil P moves inward (in the direction to the nose side). Accordingly, this can be said that the position of diffraction-section center C2 of diffraction section 60 is made inset at the position 2 to 2.5 mm horizontally from the fitting point.

Liquid crystal 18 is intervened between diffraction section 60 of diffraction-section including lens 56 and front lens 54. Liquid crystal 18 has its refractive index changed by application of the voltage (energization). liquid crystal 18 constitutes the electroactive section and the other one part of focal-length changing section.

As illustrated in FIG. 15, a pair of internal electrodes 48, 50 are arranged above diffraction section 60 and blank center C1. The pair of internal electrodes 48, 50 linearly extend downward from upper ends 58A, 68A of blank body 58 and lens body 68. Further, the pair of internal electrodes 48, 50 are arranged separately from each other in the lateral direction (the width directions of blank body 58 and lens body 68) and parallel to each other.

Here, parallel does not need to mean exactly parallel, but the internal electrodes may only be in an almost parallel state. Internal electrode 50 disposed on the left side is disposed on the left side with respect to diffraction-section center line LC2 and on the right side from left end 60AL of outer edge 60A of diffraction section 60.

Internal electrode 48 disposed on the right side is disposed on the right side with respect to diffraction-section center line LC2 and on the left side from right end 60AR of outer edge 60A of diffraction section 60.

In the present embodiment, lower end 50A of internal electrode 50 and lower end 48A of internal electrode 48 are arranged above fitting point FP and above line VC1 passing through the gravity center (blank center C1) of blank body 58 and extending in the lateral direction, and line VC3 passing through gravity center C3 of lens body 68 and extending in the lateral direction.

Specifically, as illustrated in FIG. 16, the positions of lower end 50A of internal electrode 50 and lower end 48A of internal electrode 48 are set so that, when the user of electronic glasses 10b moves the line of sight 5 degrees upward from the horizontal direction (0-degree direction), the line of sight of the user is not disturbed by internal electrodes 48, 50.

Further, in the present embodiment, the upper end parts of the pair of internal electrodes 48, 50 are each disposed in a region formed in a substantially linear shape at upper end 68A of lens body 68 and extend in a direction orthogonal to the region formed in the linear shape (that is, the normal direction of the region).

[Action and Effect of Present Embodiment]

Next, the action and effect of the present embodiment will be described.

The voltage is not applied to liquid crystal 18 in a state where the user is wearing electronic glasses 10b illustrated in FIGS. 13 and 14 and not operating switch 46. Here, the refractive index of liquid crystal 18 in the state of no voltage being applied is substantially the same as those of front lens 54 and diffraction-section including lens 56. Hence the power of the portion provided with diffraction section 60 in each of left and right lenses 12, 14 is substantially the same as the power of the portion except for diffraction section 60 in each of left and right lenses 12, 14.

When the voltage is applied to liquid crystal 18 in accordance with the operation of switch 46 by the user of electronic glasses 10b, the arrangement of liquid crystal 18 is changed and the refractive index of liquid crystal 18 changes. Thereby, the power of the portion provided with diffraction section 60 in each of left and right lenses 12, 14 becomes higher than the power of the portion except for diffraction section 60 in each of left and right lenses 12, 14. In other words, the focal length of the portion provided with diffraction section 60 becomes shorter than the focal length of the portion except for diffraction section 60 in each of left and right lenses 12, 14.

As illustrated in FIG. 15, in the present embodiment, lower end 50A of internal electrode 50 and lower end 48A of internal electrode 48 in lens body 68 are arranged above fitting point FP. It is thereby possible to prevent internal electrode 50 and internal electrode 48 from disturbing the field of view at the time when the user views the object through lenses 12.

Particularly in the present embodiment, the positions of lower end 50A of internal electrode 50 and lower end 48A of internal electrode 48 illustrated in FIG. 15 are set so that, when the user of electronic glasses 10b moves the line of sight 5 degrees upward with respect to the horizontal direction (0-degree direction), the line of sight of the user is not disturbed by internal electrodes 48, 50.

It is thereby possible to prevent internal electrode 50 and internal electrode 48 from disturbing the field of view in the range of the line of sight that the user of electronic glasses 10b uses regularly. Note that the range of the line of sight that the user of electronic glasses 10b uses regularly is a range at the time when the user of electronic glasses 10b vertically moves the line of sight downward in the range of 5 to 10 degrees from the horizontal direction (0-degree direction).

In the present embodiment, the description has been given of the example where internal electrode 50 disposed on the left side (internal electrode 50 disposed on the right side in right-side lens 14) is disposed on the right side from left end 60AL of outer edge 60A of diffraction section 60 (disposed on the left side from right end 60AR of outer edge 60A of diffraction section 60 in right-side lens 14). However, the present invention is not limited thereto.

For example, internal electrode 50 disposed on the left side may be disposed on the left side from left end 60AL of outer edge 60A of diffraction section 60. As thus described, the position of internal electrode 50 disposed on the left side may be set in a range where all of internal electrode 48 is not scraped off when lens 12 is cut out of lens blank 52.

Figure 17:
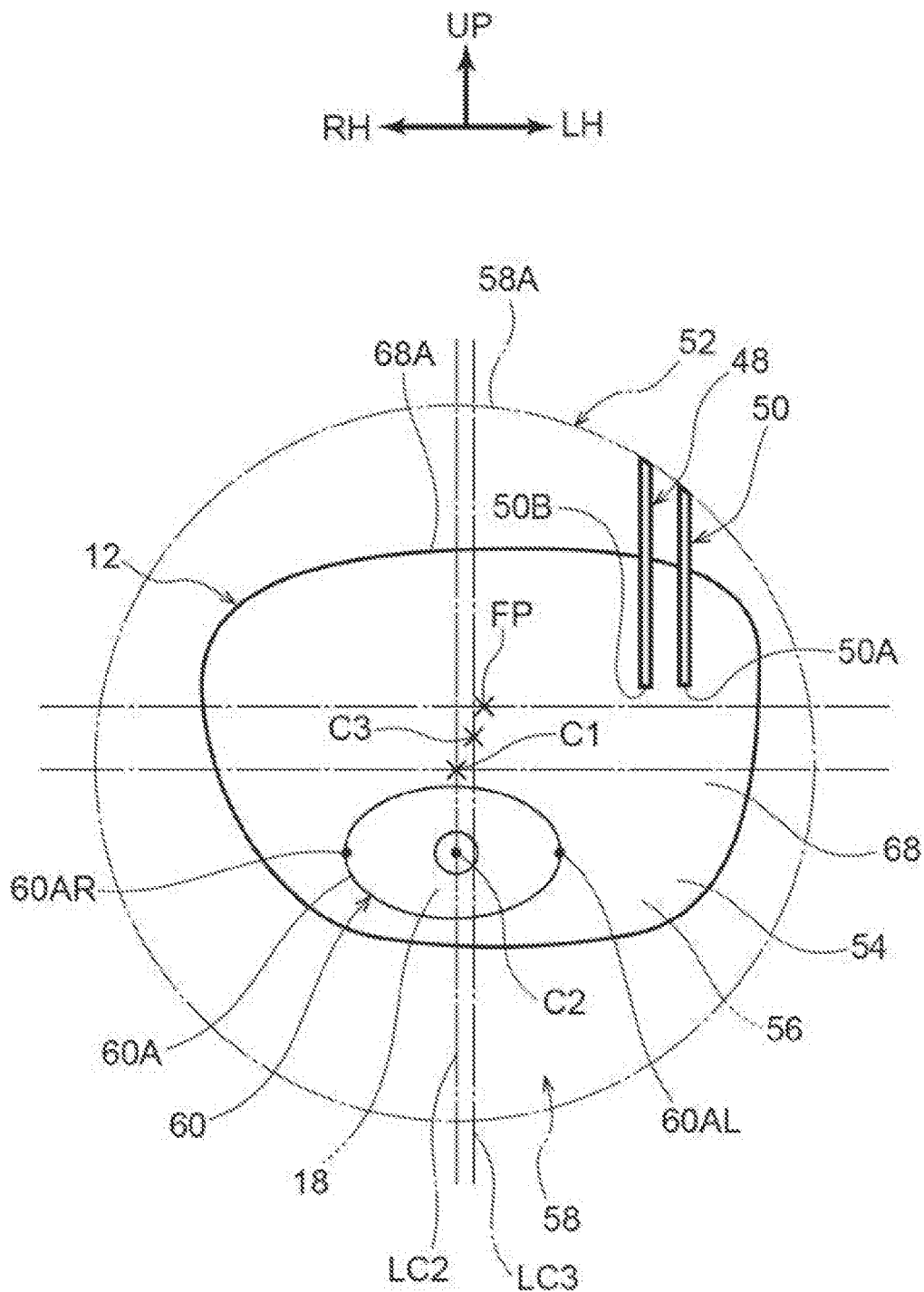
FIG. 17 is a front view illustrating a lens and a lens blank according to Modification 1 of Embodiment 3.

Alternatively, as illustrated in FIG. 17, both internal electrode 50 disposed on the left side and internal electrode 48 disposed on the right side may be arranged on the left side from left end 60AL of outer edge 60A of diffraction section 60.

To be more specific, in lens 12 of Modification 1 illustrated in FIG. 17, diffraction-section center C2 of diffraction section 60 is eccentrically located rightward from center line LC3 passing through gravity center C3 of lens body 68 and extending in the vertical direction.

The pair of internal electrodes 48, 50 are eccentrically located leftward from center line LC3. With the above configuration, it is possible to prevent internal electrode 50 and internal electrode 48 from disturbing the field of view in the vertically wide region in the front.

Here, RH is a direction in which the nose is located at the time when the user wears the lenses as glasses, and LH is a direction on the opposite side to the nose. In the case of structure illustrated in FIG. 17, in lens 12, internal electrodes 48, 50 are arranged in the direction on the opposite side to the nose. Hence internal electrodes 48, 50 are more unlikely to disturb the field of view than in the case of being arranged on the nose side.

Figure 18:
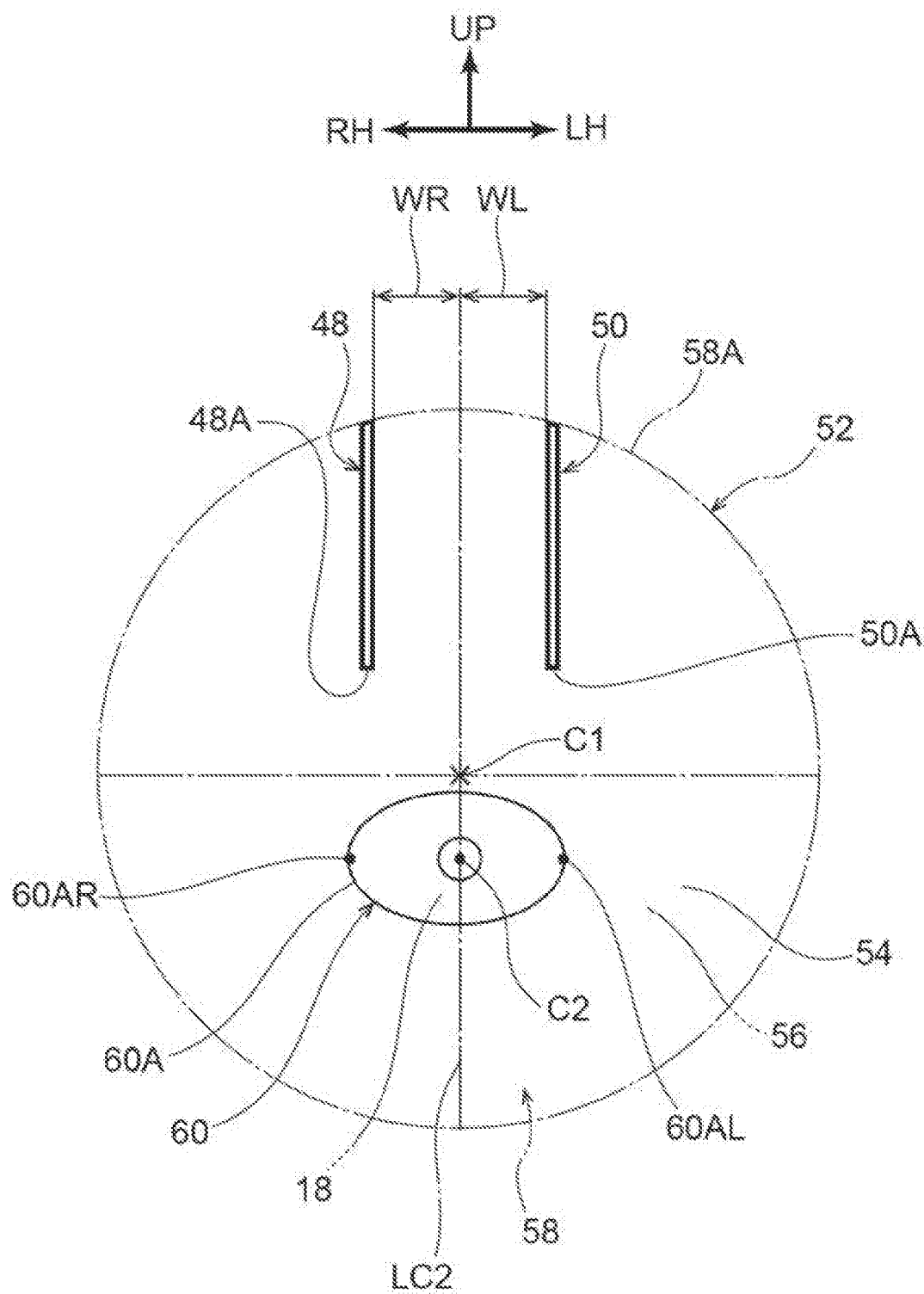
FIG. 18 is a front view illustrating a lens blank of a lens according to Modification 2 of Embodiment 3.

Further, as Modification 2 illustrated in FIG. 18, distance WL from diffraction-section center line LC2 to internal electrode 50 disposed on the left side and distance WR from diffraction-section center line LC2 to internal electrode 48 disposed on the right side may be set to be the same.

Distance WL and distance WR do not need to be strictly the same distance, but may only be distances to almost the same degree. It can also be said that internal electrodes 48, 50 are arranged to be symmetrical with respect to diffraction-section center line LC2. Here, being symmetrical may only mean that internal electrodes 48, 50 are substantially parallel to each other and have lengths to substantially the same degree and that distance WL and distance WR are distances to substantially the same degree.

Left and right lenses 12, 14 (see FIG. 14) are formed using lens blank 52 set as thus described, so that lens blank 52 can be shared for both right and left uses. That is, lens blank 52 for left-side lens 12 and lens blank 52 for right-side lens 14 do not need to be produced separately.

In the present embodiment, as illustrated in FIGS. 15 and 17, two electrodes, internal electrodes 48, 50, are arranged so as to extend downward from the substantially horizontal region at upper end 68A of lens body 68.

In other words, in a planar view from the front, the pair of substantially linear internal electrodes 48, 50 substantially parallel to each other are arranged so as to form an angle substantially vertical to the substantially linear region at upper end 68A of lens body 68.

Here, when upper end 68A of lens body 68 has the surface, the pair of internal electrodes 48, 50 each having the substantially linear shape and arranged substantially parallel to each other are arranged so as to form an angle substantially vertical to the region having the same substantially planar shape at upper end 68A.

As described above, internal electrodes 48, 50 are arranged on the substantially horizontal region on the upper surface of lens body 68, whereby the contact pressure between flexible cable 42 and each of internal electrodes 48, 50 increases and stable electric connection can be realized.

Further, internal electrodes 48, 50 are substantially parallel to each other and each have the substantially linear shape, and these internal electrodes are arranged so as to form an angle substantially vertical to the substantially horizontal region on the upper surface of lens body 68, thereby making it possible to allow a little error at the time of cutting lens body 68 out of lens blank 52.

The present embodiment as thus described is not limited to the configuration described above, but is applicable to a configuration other than the configuration described above by being subjected to various modification within a range not deviating from the gist of the invention. Further, the present embodiment can be performed in a combination with other embodiments in a technically consistent range.

Summary of Present Embodiment

The lens, the lens blank, and the eyewear according Embodiment 3 described above include the following aspects:

[First Aspect]

A first aspect of the lens according to Embodiment 3 above is provided with: a lens body; an electroactive section provided in a part of a region of the lens body; and a pair of electrodes that are used for electrically controlling the electroactive section while being buried in the lens body, and are arranged substantially parallel to and separately from each other in a width direction being a direction orthogonal to a vertical direction of the lens body while extending downward from the upper-side end of the lens body, the pair of electrode having lower end parts arranged separately from the electroactive section in the vertical direction of the lens body.

According to the first aspect, it is possible to prevent the end part of the pair of electrodes on the electroactive section side from disturbing the field of view in the lens body.

[Second Aspect]

A lens according to a second aspect is the lens according to the first aspect, in which the pair of electrodes are arranged in a region within a range in the width direction where the electroactive section is arranged, the region being separated vertically upward from the electroactive section.

According to the lens of the second aspect, it is possible to ensure the field of view between the electroactive section and the lower end parts of the pair of electrodes

[Third Aspect]

A lens according to a third aspect is the lens according to the first aspect, in which the lower end parts of the pair of electrodes are located above a point at which a pupil of a user of the lens is assumed to be located when the user sees the front side.

According to the lens of the third aspect, when the user of the lens views the front side, it is possible to prevent the pair of electrodes from disturbing the field of view

[Fourth Aspect]

A lens according to a fourth aspect is the lens according to the first aspect, in which the pair of electrodes are arranged substantially symmetrically with respect to a center line of the electroactive section passing through a gravity center of the electroactive section as seen from a thickness direction of the lens body and extending in the vertical direction of the lens body.

According to the lens of the fourth aspect, the right and left lenses can be formed out of the same one lens blank.

[Fifth Aspect]

A lens according to a fifth aspect is the lens according to the first aspect, in which the pair of electrodes are arranged in substantially linear regions at the upper-side end of the lens body.

According to the lens of the fifth aspect, the upper ends of the pair of electrodes can be easily connected to an external electrode.

[Sixth Aspect]

A lens according to a sixth aspect is the lens according to the fifth aspect, in which the pair of electrodes each have the same substantially linear shape and are arranged substantially vertically downward from the substantially linear region of the lens body.

According to the lens of the sixth aspect, it is possible to bring the upper end parts of the pair of electrodes into contact with the external electrode in a stable state.

[Seventh Aspect]

A lens according to a seventh aspect is the lens according to the first aspect, in which the pair of electrodes each have the substantially linear shape and are set to have lengths to the same degree.

According to the lens of the seventh aspect, electric resistance of the pair of electrodes can be set to be almost the same.

[Eighth Aspect]

A lens according to an eighth aspect is the lens according to the first aspect, in which the pair of electrodes are located above a center line of the lens body passing through a gravity center of the lens body as seen from a thickness direction of the lens body and extending in the width direction.

According to the lens of the eighth aspect, when the user of the lens views the front side, it is possible to prevent the pair of electrodes from disturbing the field of view.

[Ninth Aspect]

A lens according to a ninth aspect is the lens according to the first aspect, in which the pair of electrodes are arranged on the outside of one end part of the electroactive section in the width direction of the lens body.

According to the lens of the ninth aspect, it is possible to prevent the pair of electrodes from disturbing the field of view.

[Tenth Aspect]

A lens according to a tenth aspect is the lens according to the first aspect, in which the gravity center of the electroactive section is eccentrically located in one direction of the width direction from a center line concerning the width direction of the lens body as seen from the thickness direction of the lens body, and the pair of electrodes are eccentrically located in the other direction of the width direction from the center line.

According to the lens of the tenth aspect, it is possible to prevent the pair of electrodes from disturbing the field of view.

[Eleventh Aspect]

A lens according to an eleventh aspect is the lens according to the tenth aspect, in which the other direction of the width direction is the opposite direction to the direction in which the nose of the user is located when the lens body is used.

According to the lens of the eleventh aspect, it is possible to prevent the pair of electrodes from disturbing the field of view.

[Twelfth Aspect]

A lens according to a twelfth aspect is the lens according to the first aspect, in which one electrode is disposed on one side of the lens body in the width direction with respect to the center line of the electroactive section passing through the gravity center of the electroactive section and extending in the vertical direction of the lens body as seen from the thickness direction of the lens body, and the other electrode is disposed on the other side of the lens body in the width direction with respect to the center line of the electroactive section and disposed closer to one side of the lens body in the width direction than the end of the electroactive section on the other side in the width direction.

According to the lens of the twelfth aspect, it is possible to ensure the field of view of the portion between the parts of the pair of electrodes in the lens body. In addition, at the time of molding the lens out of the lens blank, both the pair of electrodes can be easily arranged in the lens body.

[Thirteenth Aspect]

A lens according to a thirteenth aspect is the lens according to the first aspect, in which one electrode is disposed on one side of the lens body in the width direction with respect to the center line of the electroactive section passing through the gravity center of the electroactive section and extending in the vertical direction of the lens body as seen from the thickness direction of the lens body, the other electrode is disposed on the other side of the lens body in the width direction with respect to the center line of the electroactive section, and a distance in the width direction of the lens body between the one electrode and the center line of the electroactive section is substantially the same as a distance in the width direction of the lens body between the other electrode and the center line of the electroactive section.

According to the lens of the thirteenth aspect, the lens blank can be used as the lens black for forming the right-side lens and the lens black for forming the right-side lens at the time of molding the lens out of the lens blank.

[Fourteenth Aspect]

A lens according to a fourteenth aspect is the lens according to any one of the first to thirteenth aspects, in which the electroactive section is a focal-length changing section where a focal length is changed by energization.

According to the lens of the fourteenth aspect, the focal length of the focal-length changing section can be changed by energization of the focal-length changing section via the pair of electrodes.

[Fifteenth Aspect]

A lens blank according to a fifteenth aspect is provided with: a lens substrate; an electroactive section provided in a part of a region of the lens substrate; and a pair of electrodes that are used for electrically controlling the electroactive section while being buried in the lens substrate, and are arranged substantially parallel to and separately from each other in a width direction being a direction orthogonal to a vertical direction of the lens substrate while extending downward from the upper-side end of the lens substrate, the pair of electrode having lower end parts arranged separately from the electroactive section in the vertical direction of the lens substrate.

According to the lens blank of the fifteenth aspect, in the lens formed out of the lens blank, it is possible to prevent the pair of electrodes from disturbing the field of view.

[Sixteenth Aspect]

A lens blank according to a sixteenth aspect is the lens blank according to the fifteenth aspect, in which the pair of electrodes each have a substantially linear shape and are arranged substantially symmetrically with respect to a center line of the lens substrate passing through a gravity center of the lens substrate as seen from a thickness direction of the lens substrate and extending in the vertical direction of the lens substrate.

According to the lens blank of the sixteenth aspect, the right-side lens and the left-side lens can be formed out of the lens blank.

[Seventeenth Aspect]

A lens blank according to a seventeenth aspect is the lens blank according to the fifteenth or sixteenth aspect, in which the pair of electrodes have lengths to the same degree.

According to the lens blank of the seventeenth aspect, the right-side lens and the left-side lens can be formed out of the lens blank.

[Eighteenth Aspect]

Eyewear according to an eighteenth aspect is provided with: the lens according to any one of the first to fourteenth aspects; and a frame including a lens holder by which the lens is held, the frame being a portion to be worn by a user.

According to the eyewear of the eighteenth aspect, it is possible to prevent the end part of the pair of electrodes on the electroactive section side from disturbing the field of view in the lens body of the lens.

Embodiment 4

Embodiment 4 according to the present invention will be described below. First, how the configuration of the present embodiment has been achieved will be described. On the lens for eyewear disclosed in PTL 2 and a lens blank having the lens, a mark including predetermined information is formed. One surface of the lens disposed in PTL 1 is a convex surface and the surface on the opposite side to the one surface is a concave surface. Such a lens has a permanent mark on the concave surface and a layout mark indicating a reference position on the convex surface. However, when the mark is formed on the surface of the lens, there is a possibility that the mark may disappear or be tampered with. Therefore, the present inventors have devised the configuration of the present embodiment for the purpose of providing a lens for eyewear, a lens blank having the lens, and an eyewear on which a mark hardly disappears or is hardly tampered with.

Hereinafter, electronic glasses 100 as eyewear according to the present embodiment will be described with reference to FIGS. 19 to 23. In the following, electronic glasses will be described as a representative example of the eyewear according to the present embodiment, the electronic glasses having lenses that include electroactive regions capable of changing optical characteristics of the lenses by electric control.

Note that examples of the eyewear include glasses (including electronic glasses or sunglasses) having an auxiliary mechanism for improving the eyesight of the user such as vision corrective lenses, goggles, and various devices (for example, glasses-type wearable terminal, head-mounted display, and the like) having a mechanism to present information to the field of view, or the eyes, of the user.

In the present embodiment, electronic binocular glasses having a pair of lenses will be described, but the eyewear is not limited to this aspect. The configuration of the eyewear may be a configuration to be able to hold the following mechanisms by the user wearing the eyewear: an auxiliary mechanism to improve the eyesight, or the field of view, of the user, a mechanism to present information to the eyes of the user, and the like.

The eyewear is not limited to a glasses-type to be worn on both ears, but the eyewear may be worn on the head or one ear. Further, the eyewear is not limited to the binocular eyewear, but may be monocular eyewear.

[Configuration of Electronic Glasses]

Figure 19:
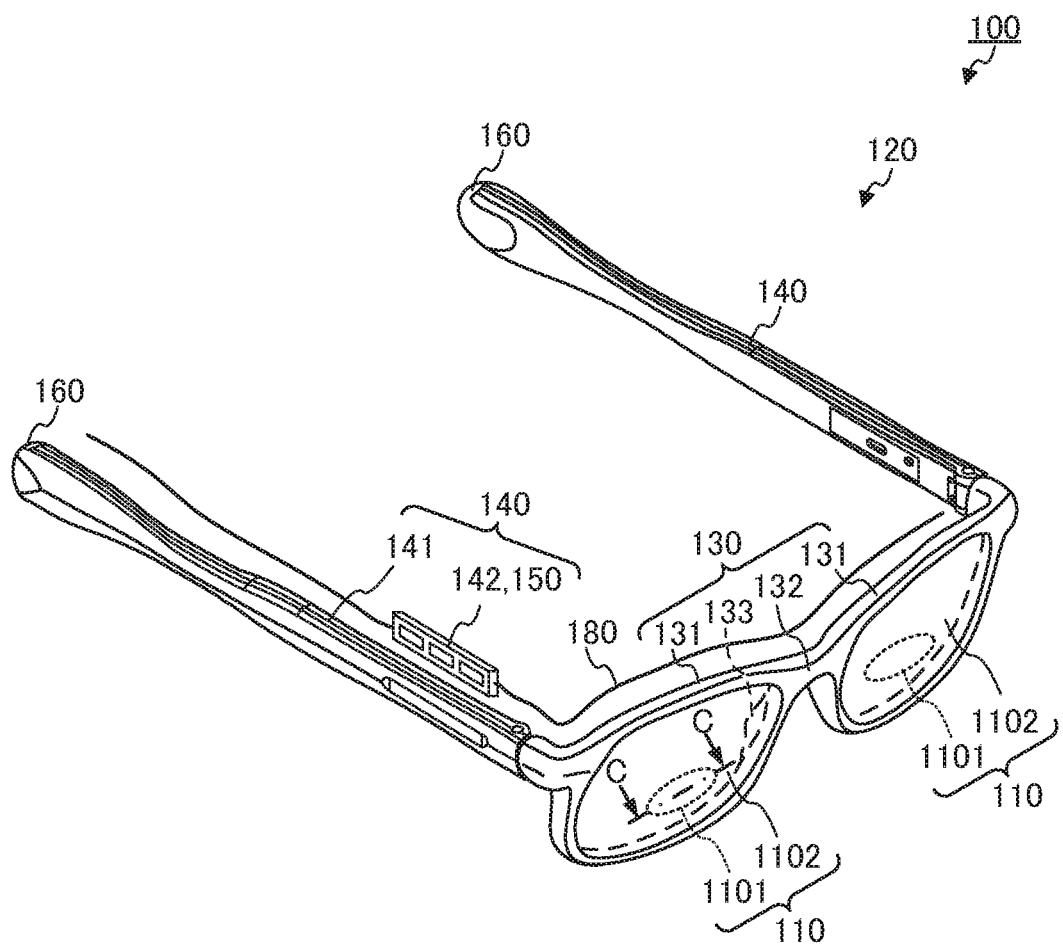
FIG. 19 is a perspective view illustrating an example of a configuration of electronic glasses according to Embodiment 4 of the present invention.
Figure 20:
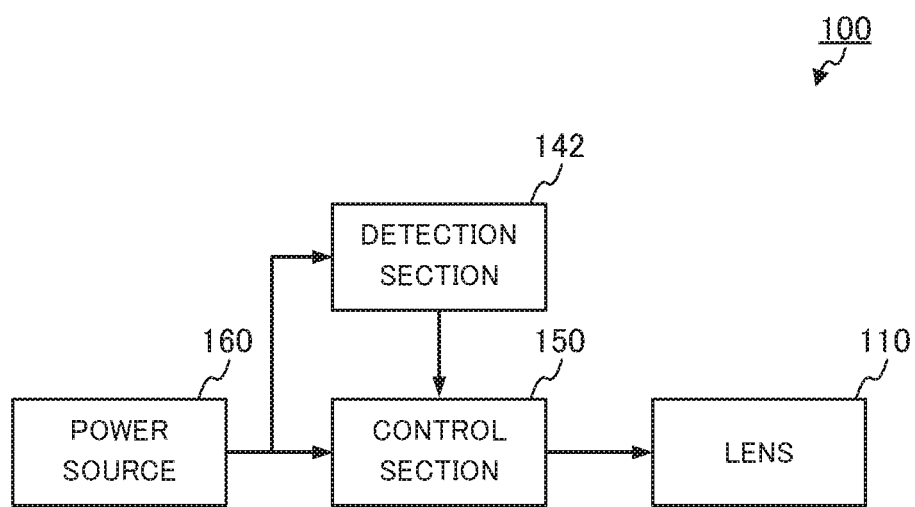
FIG. 20 is a block diagram illustrating an internal circuit of the electronic glasses according to Embodiment 4 of the present invention.

FIG. 19 is a perspective view illustrating an example of a configuration of electronic glasses 100 according to the present embodiment. Note that a basic structure of electronic glasses 100 according to the present embodiment is almost similar to that of electronic glasses 10 according to Embodiment 1 which has been described with reference to FIGS. 1 and 2. FIG. 20 is a block diagram illustrating an internal circuit of electronic glasses 100 according to the present embodiment. Electronic glasses 100 has a pair of lenses 110, frame 120, and power source 160.

Frame 120 has front 130 and a pair of temples 140. In the following, a portion where front 130 is disposed will be described as the front of electronic glasses 100 and lenses 110. Note that temple 140 for the right side and front 130 are exploded in FIG. 19.

The pair of lenses 110 are formed so as to be almost symmetrical in a front view (also referred to as a planar view from the front-rear direction or the thickness direction) of electronic glasses 100, and have the same constituent elements. Therefore, in the following, lens 110 for right eye in electronic glasses 100 will be described, and the description of the constituents of the configuration of lens 110 for left eye will be omitted.

As illustrated in FIG. 19, front 130 holds a pair of lenses 110. Front 130 has a pair of rims 131 respectively supporting the pair of lenses 110, and bridge 132 connecting between the pair of rims 131.

The shape of rim 131 is a shape corresponding to the shape of lens 110. Bridge 132 has a pair of nose pads 133 that can come into contact with the nose of the user. As illustrated in FIG. 19, wiring 180 is disposed inside front 130.

Wiring 180 electrically connects between control section 150 and one electrode (first transparent conductive layer 114 and first auxiliary electrode 117 described later) of lens 110, and electrically connects between control section 150 and the other electrode (second transparent conductive layer 116 and second auxiliary electrode 119 described later) of lens 110. In the case of the present embodiment, first auxiliary electrode 117 corresponds to internal electrodes 48, 50 (see FIG. 4) in Embodiment 1 described above.

A material for front 130 is not particularly limited. As the material for front 130, a known material to be used as a material for the front of glasses can be used. Examples of the material for front 130 include polyamide, acetate, carbon, celluloid, polyetherimide, and polyurethane.

The pair of temples 140 are formed so as to be almost symmetrical in electronic glasses 100 and have mutually the same constituent elements. Therefore, in the following, temple 140 for the right side will be described, and for constituents of temple 140 for the left side, the same numerals as those of constituents of temple 140 for the right side will be provided and the description of temple 140 for the left side will be omitted.

Temple 140 is connected to front 130 in the front end part thereof. For example, temple 140 is rotatably fitted into rim 131 of front 130.

As illustrated in FIG. 19, temple 140 has housing 141, detection section 142, and control section 150.

Housing 141 constitutes an external shape of temple 140. Housing 141 stores detection section 142, control section 150, and a part of wiring 180. Housing 141 extends along one direction. The shape of housing 141 is not particularly limited.

From the viewpoint of facilitating the user to recognize the position of detection section 142, the shape of a part of housing 141 and the shape of the other portion of housing 141 may be different from each other. In the present embodiment, the shape of a part of housing 141 and the shape of the other portion of housing 141 are different from each other.

A protruding strip is formed on the left-side surface of housing 141 (the outer-side surface of electronic glasses 100). The position of the left-side surface of housing 141 which corresponds to detection section 142 is formed to have a planar shape. This enables the user to easily recognize the position where detection section 142 is disposed. In addition, the shape of the right-side surface of housing 141 (the inner-side surface of electronic glasses 100) is a planar shape.

A material for housing 141 is not particularly limited. As the material for housing 141, a known material to be used as a material for a temple of glasses can be used. Examples of the material for housing 141 are the same as the examples of material for front 130. From the viewpoint of facilitating the user to recognize the position of detection section 142, a material for a part of housing 141 and a material for the other portions of housing 141 may be different from each other Detection section 142 has a capacitive detection pad, for example. As the detection pad, a known detection pad usable as a touch sensor can be used. When an object (the finger of the user, or the like) touches a position of housing 141 which corresponds to detection section 142, detection section 142 detects a change in capacitance generated by the touch.

Control section 150 is electrically connected to the detection pad of detection section 142 and the electrodes (first transparent conductive layer 114, first auxiliary electrode 117, second transparent conductive layer 116, and second auxiliary electrode 119) of lens 110 via wiring 180.

Control section 150 controls a voltage across first transparent conductive layer 114 and second transparent conductive layer 116 to control an optical characteristic of first region 1101 (described later) of lens 110. More specifically, when detection section 142 detects a touch of the object, control section 150 applies the voltage to a predetermined region of each of the pair of lenses 110 or stops applying the voltage and switches the optical characteristic (a focal length in the present embodiment) of first region 1101 (see FIG. 20).

Control section 150 has a control circuit that, for example, drives the detection pad and detects a change in capacitance in the detection pad. Control section 150 also has a control circuit that controls application of the voltage across first transparent conductive layer 114 and second transparent conductive layer 116 (liquid crystal layer 115 in the present embodiment) of lens 110.

Control section 150 is, for example, mounted in detection section 142 in a state connected to the detection pad so as to receive results of detection of the change in capacitance in the detection pad.

Power source 160 supplies electric power to detection section 142 and control section 150 (see FIG. 20). In the present embodiment, power source 160 is a rechargeable battery pack removably held in the other end part (rear end part) of temple 140. Examples of power source 160 include a nickel-metal hydride battery.

(Configuration of Lens)

Figure 21:
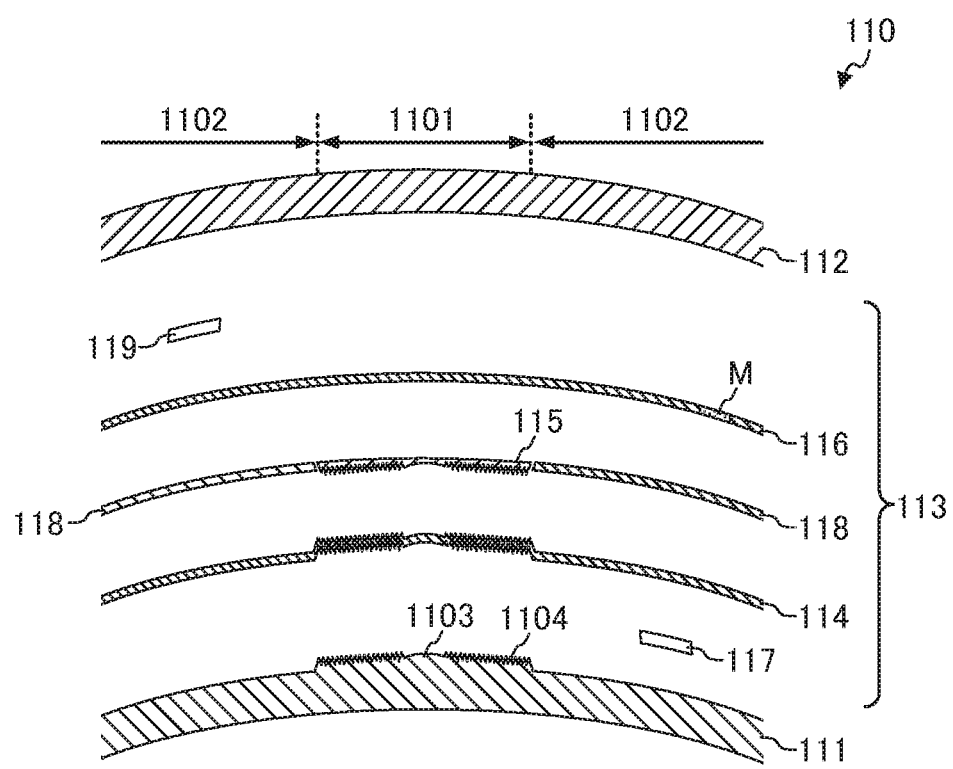
FIG. 21 is a sectional schematic view schematically illustrating an example of a configuration of a lens.

FIG. 21 schematically illustrates an example of the configuration of lens 110 and is an exploded sectional view schematically illustrating the configuration of lens 110 cut along a line C-C of FIG. 19.

As illustrated in FIG. 21, lens 110 has first transparent substrate 111, second transparent substrate 112 disposed on first transparent substrate 111, and intermediate layer 113. Intermediate layer 113 is disposed between first transparent substrate 111 and second transparent substrate 112. Although detailed in later, mark M including information is formed in intermediate layer 113.

Lens 110 has first region (electroactive region) 1101 where a focal length (power) is switchable with the voltage, and second region 1102 placed in a region except for first region 1101. Lens 110 may be a spherical lens or an aspherical lens. The shape of lens 110 can be appropriately adjusted in accordance with expected optical power.

The shape, size, and position of first region 1101 can be appropriately designed in accordance with the size of lens 110, the use of lens 110, and the like. Examples of the use of lens 110 include a near-and-far bifocal lens, a near-and-mid bifocal length, and near-and-near bifocal lens. As illustrated in FIG. 19, first region 1101 is placed below the center part of lens 110 in a front view of lens 110.

First region 1101 has first transparent substrate 111, first transparent conductive layer 114, liquid crystal layer 115, second transparent conductive layer 116, and second transparent substrate 112. Intermediate layer 113 in first region 1101 has first transparent conductive layer 114, liquid crystal layer 115, and second transparent conductive layer 116.

Second region 1102 has first transparent substrate 111, first auxiliary electrode 117, first transparent conductive layer 114, adhesive layer 118, second transparent conductive layer 116, second auxiliary electrode 119, and second transparent substrate 112.

Intermediate layer 113 in second region 1102 has first auxiliary electrode 117, first transparent conductive layer 114, adhesive layer 118, second transparent conductive layer 116, and second auxiliary electrode 119. In the present embodiment, mark M is formed in second transparent conductive layer 116 on second region 1102.

Each constituent of lens 110 has translucency to visible light.

First transparent substrate 111 is disposed on the rear side (the user side) of lens 110 in electronic glasses 100. First transparent substrate 111 is curved toward the front side of electronic glasses 100 so as to have a protruding shape. The curvature and the shape of first transparent substrate 111 can be appropriately adjusted in accordance with the expected optical power.

The size of first region 1101 and the shape thereof in a planar view can be appropriately adjusted in accordance with the breadth of the visual field of a human. For example, first region 1101 is preferably formed so as to have a lateral length larger than a vertical length.

In the present embodiment, the shape of first region 1101 in a planar view is an elliptical shape. In the present specification, the shape of first region 1101 in the planar view means the shape of first region 1101 as seen from a point located on an optical axis of light incident on lens 110 on the front side of electronic glasses 100.

On one surface of first transparent substrate 111, first region 1101 is formed with spherical protrusion 1103 disposed at the center portion and a plurality of annular protruding strips 1104 arranged on the outside of protrusion 1103.

The plurality of protruding strips 1104 are arranged concentrically. In the present specification, the "outside" means a position more distant from the center of the first region (also the center of protrusion 1103) along the direction orthogonal to the optical axis of the light incident on lens 110 from the front side of electronic glasses 100 in a state where lens 110 is in use (a state where lens 110 is incorporated in electronic glasses 100 and in use).

The shapes of protrusion 1103 and protruding strip 1104 can be appropriately adjusted in accordance with the expected optical power at the time of diffracting light having been incident from the front of electronic glasses 100. Examples of the shapes of protrusion 1103 and protruding strip 1104 include a Fresnel-lens shape. A part of each of protrusion 1103 and protruding strip 1104 may have the Fresnel-lens shape, or all of each of protrusion 1103 and protruding strip 1104 may have the Fresnel-lens shape.

A material for first transparent substrate 111 is not particularly limited so long as having translucency. For example, as the material for first transparent substrate 111, a known material usable as a material for a lens can be used.

Examples of the material for first transparent substrate 111 include glass and resin. Examples of the resin include polymethyl methacrylate, polycarbonate, polydiethyleneglycol bis allyl carbonate, and polystyrene.

First transparent conductive layer 114 and second transparent conductive layer 116 are a pair of transparent conductive layers having translucency. First transparent conductive layer 114 and second transparent conductive layer 116 in first region 1101 are a pair of transparent electrodes for application of the voltage across first transparent conductive layer 114 and second transparent conductive layer 116 (liquid crystal layer 115 in the present embodiment).

First transparent conductive layer 114 is disposed on first transparent substrate 111 side in intermediate layer 113. In the present embodiment, first transparent conductive layer 114 is disposed on the surface of first transparent substrate 111 on the second transparent substrate 112 side.

Second transparent conductive layer 116 is disposed on second transparent substrate 112 side in intermediate layer 113. In the present embodiment, second transparent conductive layer 116 is disposed on the surface of second transparent substrate 112 on the first transparent substrate 111 side.

First transparent conductive layer 114 and second transparent conductive layer 116 may only be disposed at least over a range (first region 1101) where the voltage can be applied to liquid crystal layer 115. Hence first transparent conductive layer 114 and second transparent conductive layer 116 may be disposed in second region 1102 or may not be disposed.

From the viewpoints of making first transparent conductive layer 114 and second transparent conductive layer 116 externally inconspicuous and holding down manufacturing cost of lens 110, first transparent conductive layer 114 and second transparent conductive layer 116 are preferably arranged substantially all over first region 1101 and second region 1102.

In the present embodiment, first transparent conductive layer 114 and second transparent conductive layer 116 are arranged substantially all over first region 1101 and second region 1102.

Figure 22A:
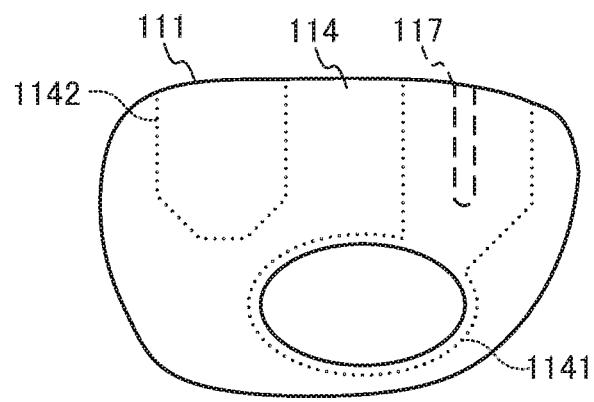
FIG. 22A is an assembly diagram illustrating an example of a configuration of a part of the lens.
Figure 22B:
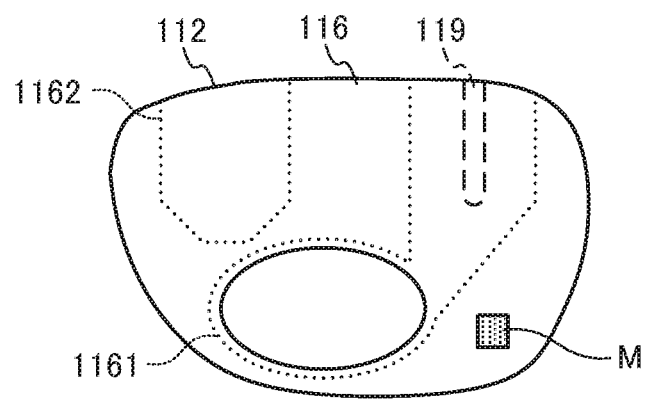
FIG. 22B is an assembly diagram seen from the opposite direction to FIG. 22A.

FIGS. 22A and 22B are assembly diagrams each illustrating an example of the configuration of a part of the lens. FIG. 22A is an assembly diagram of first transparent substrate 111, first transparent conductive layer 114, and first auxiliary electrode 117 in the case of viewing lens 110 from second transparent substrate 112 side. Meanwhile, FIG. 22B is an assembly diagram of second transparent substrate 112, second transparent conductive layer 116, and second auxiliary electrode 119 in the case of viewing lens 110 from first transparent substrate 111 side.

From the viewpoint of lowering the possibility of an electric short circuit in first transparent conductive layer 114 and second transparent conductive layer 116 in intermediate layer 113, it is preferable to use, as the electrode, only a portion of each of first transparent conductive layer 114 and second transparent conductive layer 116, the portion being necessary for application of the voltage to liquid crystal layer 115.

From the viewpoint as thus described, in the present embodiment, first transparent conductive layer 114 has first slit 1141 and second slit 1142 for insulation (see dotted lines of FIG. 22A).

More specifically, first slit 1141 is formed in first transparent conductive layer 114 so that a region including first region 1101 and a portion of second region 1102 where first auxiliary electrode 117 is disposed and a region except for the above region are insulated from each other.

Further, second slit 1142 is formed in first transparent conductive layer 114 so that a region including a portion of second region 1102 which corresponds to second auxiliary electrode 119 and a region except for the above region are insulated from each other.

In the present embodiment, second transparent conductive layer 116 has third slit 1161 and fourth slit 1162 for insulation (see dotted lines of FIG. 22B).

More specifically, third slit 1161 is formed in second transparent conductive layer 116 so that a region including first region 1101 and a portion of second region 1102 where second auxiliary electrode 119 is disposed and a region except for the above region are insulated from each other.

Further, fourth slit 1162 is formed in second transparent conductive layer 116 so that a region including a portion of second region 1102 which corresponds to first auxiliary electrode 117 and a region except for the above region are insulated from each other.

Each of first transparent conductive layer 114 and second transparent conductive layer 116 has a thickness not particularly limited so long as being able to function as the transparent electrode. For example, the thickness of each of first transparent conductive layer 114 and second transparent conductive layer 116 is from 5 to 50 nm.

The thickness of each of first transparent conductive layer 114 and second transparent conductive layer 116 can be appropriately adjusted in accordance with a material for each of these layers. Although detailed in later, in the present embodiment, mark M is formed by printing or engraving on second transparent conductive layer 116.

Here, the engraving means cutting off or machining a part of second transparent conductive layer 116 to form any of a letter, a figure, a symbol, a barcode, and a trademark, or a combination of these.

The material for each of first transparent conductive layer 114 and second transparent conductive layer 116 is not particularly limited so long as having expected translucency and conductivity. Examples of the material for each of first transparent conductive layer 114 and second transparent conductive layer 116 include Indium tin oxide (ITO) and zinc oxide (ZnO). The material for first transparent conductive layer 114 and the material for second transparent conductive layer 116 may be the same as or different from each other.

Liquid crystal layer 115 is disposed between first transparent substrate 111 and second transparent substrate 112. Liquid crystal layer 115 may be sandwiched directly between first transparent substrate 111 and second transparent substrate 112, or another constituent may be disposed between first transparent substrate 111 and liquid crystal layer 115 or between liquid crystal layer 115 and second transparent substrate 112.

In the present embodiment, liquid crystal layer 115 is disposed between first transparent conductive layer 114 and second transparent conductive layer 116 in a region corresponding to first region 1101. The shape of liquid crystal layer 115 is a shape corresponding to the shapes of protrusion 1103 and the plurality of annular protruding strips 1104 in first region 1101.

Liquid crystal layer 115 is configured so as to change its refractive index in accordance with application or non-application of the voltage. Although detailed in later, for example, in a state where no voltage is being applied to liquid crystal layer 115, the refractive index of liquid crystal layer 115 is almost the same as the refractive index of first transparent substrate 111 and the refractive index of second transparent substrate 112.

On the other hand, in a state where the voltage is being applied to liquid crystal layer 115, the refractive index of liquid crystal layer 115 can be adjusted so as to be different from the refractive index of first transparent substrate 111 and the refractive index of second transparent substrate 112.

Liquid crystal layer 115 contains a liquid crystal material. An oriented state of the liquid crystal material at the time when the voltage is being applied and an oriented state of the liquid crystal material at the time when no voltage is being applied are different from each other. The liquid crystal material can be appropriately adjusted in accordance with the refractive index of first transparent substrate 111 and the refractive index of second transparent substrate 112. Examples of the liquid crystal material include cholesteric liquid crystal and nematic liquid crystal.

Second transparent substrate 112 is disposed on first transparent substrate 111 so as to sandwich first transparent conductive layer 114, liquid crystal layer 115, and second transparent conductive layer 116. Second transparent substrate 112 is disposed on the front side of lens 110 in electronic glasses 100.

Second transparent substrate 112 is also curved toward the front side of electronic glasses 100 so as to have a protruding shape. The curvature of second transparent substrate 112 corresponds to the curvature of first transparent substrate 111. Examples of the material for second transparent substrate 112 are the same as the examples of the material for first transparent substrate 111.

In second region 1102, adhesive layer 118 is disposed between first transparent substrate 111 and second transparent substrate 112 to make first transparent substrate 111 and second transparent substrate 112 adhere to each other.

When first transparent conductive layer 114 and second transparent conductive layer 116 are also disposed in second region 1102, adhesive layer 118 is disposed between first transparent conductive layer 114 and second transparent conductive layer 116. Adhesive layer 118 also has a function to seal the liquid crystal material constituting liquid crystal layer 115.

Adhesive layer 118 is made of a hardened material of an adhesive. The material for the adhesive is not particularly limited so long as having expected translucency and being able to adequately make first transparent substrate 111 and second transparent substrate 112 adhere to each other. An adhesive having an expected refractive index is selected from the viewpoint of adjusting optical power of lens 110.

In the front view of lens 110, first auxiliary electrode 117 extends inward from the outer edge of lens 110 and is electrically connected to first transparent conductive layer 114 (see FIG. 22A). In the present embodiment, first auxiliary electrode 117 is disposed between first transparent substrate 111 and first transparent conductive layer 114 in second region 1102.

First auxiliary electrode 117 is a transparent electrode having a thickness to some degree. Wiring 180 (see FIG. 19) connected to an external circuit (control section 150 in the present embodiment) and first transparent conductive layer 114 come into contact with each other at the outer edge of lens 110.

The total of the contact area between wiring 180 and first auxiliary electrode 117 and the contact area between wiring 180 and first transparent conductive layer 114 is large as compared with the contact area between the wiring 180 and first transparent conductive layer 114. Hence the external circuit and first transparent conductive layer 114 can be more reliably connected electrically.

The position, the thickness, and the shape of first auxiliary electrode 117 are not particularly limited so long as the above function can be exerted. From the viewpoint of contact with wiring 180, first auxiliary electrode 117 may only be exposed in the outer edge part of lens 110. In the present embodiment, first auxiliary electrode 117 extends from the upper edge of lens 110 to the center part of lens 110 in the front view of lens 110. The shape of first auxiliary electrode 117 in a planar view is not particularly limited but may, for example, be a linear shape. The thickness of first auxiliary electrode 117 is, for example, from 0.1 to 50 µm.

In the front view of lens 110, second auxiliary electrode 119 extends inward from the outer edge of lens 110 and is electrically connected to second transparent conductive layer 116. In the present embodiment, second auxiliary electrode 119 is disposed between second transparent substrate 112 and second transparent conductive layer 116 in second region 1102.

Second auxiliary electrode 119 is also a transparent electrode having a thickness to some degree from a similar viewpoint to first auxiliary electrode 117. The position, the thickness, and the shape of second auxiliary electrode 119 are similar to the position, thickness, and the shape of first auxiliary electrode 117.

The positional relation between first auxiliary electrode 117 and second auxiliary electrode 119 is not particularly limited so long as the above function can be exerted. For example, each of first auxiliary electrode 117 and second auxiliary electrode 119 may each extend inward from one outer edge of lens 110, or may extend inward from both outer edges of lens 110 located in positions opposite to each other.

In the present embodiment, in the front view of lens 110, first auxiliary electrode 117 and second auxiliary electrode 119 are arranged so as to be adjacent to each other and each extend inward from one outer edge of lens 110. In the present specification, that first auxiliary electrode 117 and second auxiliary electrode 119 are "adjacent" to each other means that a space (the shortest distance) between first auxiliary electrode 117 and second auxiliary electrode 119 is from 2 to 48 mm.

Intermediate layer 113 may further have another constituent having translucency, as required. Examples of another constituent include an insulating layer and an oriented film.

The insulating layer prevents an electric short circuit between first transparent conductive layer 114 and second transparent conductive layer 116 via liquid crystal layer 115. For example, the insulating layer is disposed between first transparent conductive layer 114 and liquid crystal layer 115, and the insulating layer is also disposed between liquid crystal layer 115 and second transparent conductive layer 116. As a material for the insulating layer, a known material usable as an insulating layer having translucency can be used. Examples of the material for the insulating layer include silicon dioxide.

The oriented film controls the oriented state of the liquid crystal material in liquid crystal layer 115. For example, the oriented film is disposed between first transparent conductive layer 114 and liquid crystal layer 115, and between liquid crystal layer 115 and second transparent conductive layer 116. As a material for the oriented film, a known material usable as an oriented film of the liquid crystal material can be used. Examples of the material for the oriented film include polyimide.

Mark M is formed in intermediate layer 113, that is, on at least one layer constituting intermediate layer 113. Mark M may be a through hole formed in the layer in a predetermined pattern, or may be a fluorescence dye disposed on the layer in a predetermined pattern.

Mark M can be formed by engraving or printing on the layer. In the present embodiment, mark M is a through hole formed in a predetermined pattern in a part of second transparent conductive layer 116. Mark M is made of the through hole formed in a transparent layer in intermediate layer 113, and is thus inconspicuous as compared with a mark formed of colored ink, for example.

Although detailed in later, from the viewpoint of preventing an increase in time for manufacturing lens 110, mark M is preferably formed in one or both of first transparent conductive layer 114 and second transparent conductive layer 116.

Mark M has various pieces of information on lens 110. Examples of mark M include a letter, a figure, a symbol, a barcode, and a trademark. Examples of the information include information on manufacturing of lens 110, information on the material for lens 110, information on performance of lens 110, information on structural features of lens 110, information used at the time of sale of lens 110, and information on transportation of lens 110.

Mark M includes at least one piece of the information described above. Examples of the information on manufacturing of lens 110 include a manufacturing number, a date manufactured, manufacturing certification by a manufacturer, and a model name provided by a manufacturing company.

Examples of the information on the material for lens 110 include information on traceability of the material, raw materials, and the like of lens 110. Examples of the information on the characteristics of lens 110 include information on optical characteristics such as a power and a refractive index of lens 110. Examples of the characteristics of lens 110 include a distance between the electrodes, a power for long sight, and a power for short sight.

The position of mark M is not particularly limited but is preferably a position hardly visible from the user using electronic glasses 100. From the viewpoint of the visibility of the user, mark M is preferably placed below a horizontal line passing through the center of gravity of lens 110 in the front view of lens 110.

Further, mark M is preferably placed on the laterally outer side of electronic glasses 100 than a vertical line passing through the center of gravity of lens 110 in the front view of lens 110. In the present embodiment, mark M is placed so as to be adjacent to first region 1101 in the laterally outer-side region of electronic glasses 100 in the front view of electronic glasses 100.

As thus described, from the viewpoint of mark M being hardly visible from the user using electronic glasses 100, it is preferable that mark M be placed below the horizontal line passing through the center of gravity of lens 110 and on the laterally outer side of electronic glasses 100 from the vertical line passing through the center of gravity of lens 110 in the front view of lens 110.

Further, from the above viewpoint, mark M is preferably placed on the more opposite side to the user of electronic glasses 100 (lens 110) than the middle point of intermediate layer 113 (placed on the front side of electronic glasses 100) in the thickness direction of lens 110.

That is, in intermediate layer 113, mark M is preferably placed on the layer located closer to second transparent substrate 112 than liquid crystal layer 115. For example, mark M is preferably formed in second transparent conductive layer 116. In the present embodiment, mark M is formed in second transparent conductive layer 116.

[Configuration of Lens Blank]

Figure 23:
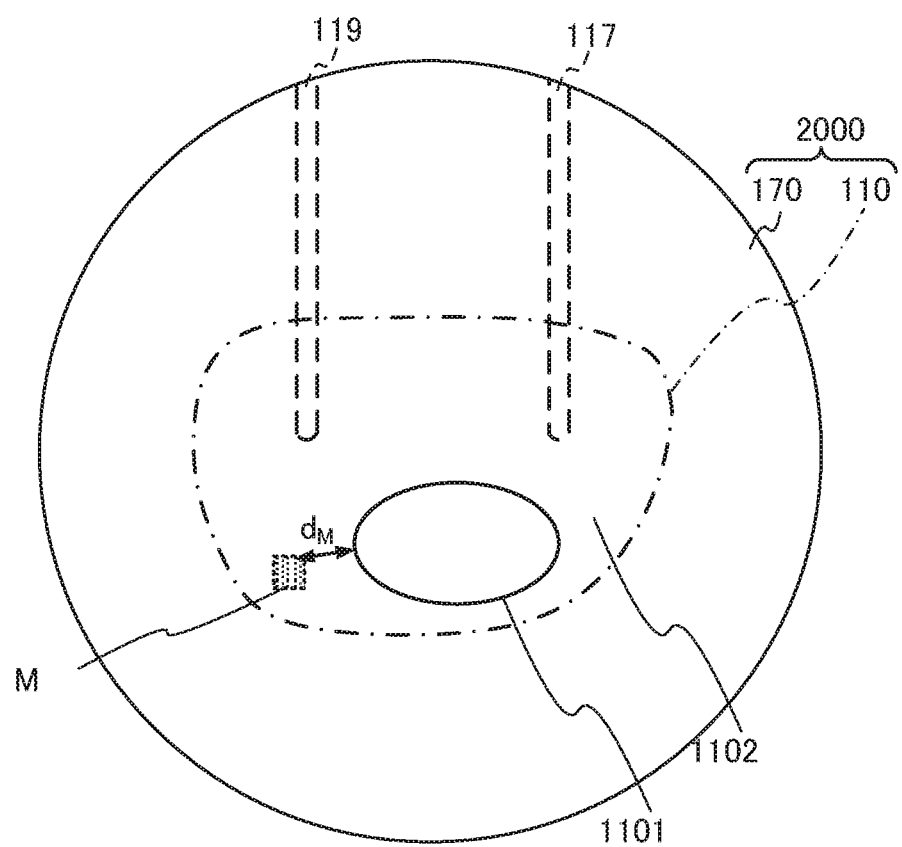
FIG. 23 is a planar view illustrating an example of a configuration of a lens blank.

Lens 110 may be configured together with blank part 170 as a unit. FIG. 23 illustrates an example of a configuration of lens blank 2000. FIG. 23 is a front view of lens blank 2000. In FIG. 23 symbol $d_M$ denotes a space (the shortest distance) between mark M and first region 1101.

As illustrated in FIG. 23, lens blank 2000 has lens 110 and blank part 170. Lens 110 and blank part 170 are formed as a unit. The external shape of lens blank 2000 in a planar view from the front-rear direction (the state illustrated in FIG. 23) is not particularly limited but is, for example, a circular shape.

Blank part 170 is disposed on the outer side of lens blank 2000 so as to surround lens 110. The configuration of blank part 170 is the same as the configuration of second region 1102 in lens 110, for example.

In the planar view of lens blank 2000, each of first auxiliary electrode 117 and second auxiliary electrode 119 extends inward from the outer edge of lens blank 2000. That is, in the planar view of lens blank 2000, each of first auxiliary electrode 117 and second auxiliary electrode 119 crosses the inner edge of blank part 170 from the outer edge of blank part 170 and extends to the inside of lens 110.

Although not particularly illustrated, in blank part 170, each of first slit 1141, second slit 1142, third slit 1161, and fourth slit 1162 also extends inward from the outer edge of lens blank 2000 in accordance with the range in which each of first auxiliary electrode 117 and second auxiliary electrode 119 extends.

[Lens Manufacturing Method]

Lens 110 can be manufactured by, for example, the following manufacturing method. First, lens blank 2000 is manufactured. Specifically, first transparent substrate 111 and second transparent substrate 112 are prepared. First transparent substrate 111 and second transparent substrate 112 can be manufactured by injection molding, for example.

Subsequently, first auxiliary electrode 117 is formed in a predetermined position on first transparent substrate 111, and second auxiliary electrode 119 is formed in a predetermined position on second transparent substrate 112. Examples of a method for forming first auxiliary electrode 117 on first transparent substrate 111 and a method for forming second auxiliary electrode 119 on second transparent substrate 112 include vacuum evaporation and sputtering.

Next, first transparent conductive layer 114 is formed on first transparent substrate 111 on which first auxiliary electrode 117 is formed, and second transparent conductive layer 116 is formed on second transparent substrate 112 on which second auxiliary electrode 119 is formed. Examples of a method for forming first transparent conductive layer 114 on first transparent substrate 111 and a method for forming second transparent conductive layer 116 on second transparent substrate 112 include vacuum evaporation and sputtering.

First transparent conductive layer 114 may be formed on the whole surface of first transparent substrate 111 or may be formed on a part of the surface. However, for forming first transparent conductive layer 114 only on a part of the surface of first transparent substrate 111, other parts such as a mask may need to be prepared or installed.

Thus, from the viewpoint of preventing an increase in manufacturing cost and manufacturing time for lens 110 (lens blank 2000), first transparent conductive layer 114 is preferably formed on the whole surface of first transparent substrate 111.

As described above, also from the viewpoint of making first transparent conductive layer 114 externally inconspicuous, first transparent conductive layer 114 is preferably formed on the whole surface of first transparent substrate 111. The same applies to second transparent conductive layer 116.

Subsequently, mark M is formed in intermediate layer 113. In the present embodiment, mark M is formed in second transparent conductive layer 116.

A method for forming mark M is not particularly limited so long as being able to adequately form mark M in intermediate layer 113. Examples of the method for forming mark M include laser marking and making-off.

From the viewpoint of the clearness of mark M and manufacturing cost, the method for forming mark M is preferably laser marking. For example, when a conductive material constituting each of first transparent conductive layer 114 and second transparent conductive layer 116 contains ITO, mark M can be engraved in an ITO conductive layer by an yttrium-aluminum-garnet (YAG) laser or yttrium-vanadate (YVO4) laser having an ITO absorption wavelength.

Note that mark M may also be formed by the following method. For example, mark M may be formed by previously placing ink in a predetermined pattern on second transparent substrate 112, forming second transparent conductive layer 116, and then removing second transparent conductive layer 116 disposed on the ink, along with the ink.

When first transparent conductive layer 114 is disposed over the whole surface of first transparent substrate 111, it is preferable to form first slit 1141 and second slit 1142 in first transparent conductive layer 114. When second transparent conductive layer 116 is disposed over the whole surface of second transparent substrate 112, it is preferable to form third slit 1161 and fourth slit 1162 in second transparent conductive layer 116.

Examples of a method for forming first slit 1141 and second slit 1142 in first transparent conductive layer 114 and examples of a method for forming third slit 1161 and fourth slit 1162 in second transparent conductive layer 116 are the same as the examples of the method for forming mark M.

By forming mark M in one or both of first transparent conductive layer 114 and second transparent conductive layer 116, it is possible to form mark M at the same time as formation of first slit 1141, second slit 1142, third slit 1161, and fourth slit 1162, which is preferred from the viewpoint of preventing an increase in time for manufacturing lens 110 (lens blank 2000). Further, from a similar viewpoint, mark M is preferably formed on one or both of first auxiliary electrode 117 and second auxiliary electrode 119.

Subsequently, the liquid crystal material is provided in a portion corresponding to first region 1101 of first transparent substrate 111 where first transparent conductive layer 114 is formed, and the adhesive is provided in a portion corresponding to second region 1102 of first transparent substrate 111. With the liquid crystal material and the adhesive disposed on first transparent substrate 111, second transparent substrate 112 formed with second transparent conductive layer 116 is disposed on first transparent substrate 111. Then, the adhesive is hardened, so that lens blank 2000 can be manufactured.

Finally, lens blank 2000 is processed into expected shape and size, to obtain lens 110 having expected external shape and size. At this time, lens blank 2000 is processed so that each of first auxiliary electrode 117 and second auxiliary electrode 119 is included in lens 110. In the present embodiment, lens blank 2000 is cut along a dashed-dotted line illustrated in FIG. 23, to obtain lens 110.

In the present embodiment as well, similarly to Embodiments 1 to 3 described above, on the outer periphery of lens 110, the shape of the first region (specifically, first fitting part 74 of Embodiment 1 described above) including the portion where first auxiliary electrode 117 and second auxiliary electrode 119 are exposed may be made appropriately different from the shape of the second region (specifically, second fitting part 76 of Embodiment 1 described above) being the portion except for the first region. To such a configuration, the configuration of each of the embodiments described above can be applied as appropriate.

Lens blank 2000 and lens 110 according to the present embodiment can be manufactured in such a manner as above. As described above, lens 110 is obtained by processing lens blank 2000 into an expected shape and size. It is thus necessary for mark M to be placed in the region that is cut out as lens 110 in lens blank 2000.

Lens 110 is cut out of lens blank 2000 so as to include first region 1101, the tip part of first auxiliary electrode 117, and the tip part of second auxiliary electrode 119. Hence mark M to be placed on lens 110 is preferably placed near first region 1101 and the tip part of first auxiliary electrode 117 and near the tip part of second auxiliary electrode 119.

For example, in the present embodiment, in the front view of lens 110, at least a part of mark M is preferably placed in a region with distance $d_M$ equal to or shorter than 24 mm from first region 1101.

(Modifications)

Meanwhile, the position of mark M is not limited to the position described above. FIGS. 24A to 24D illustrate examples of configurations of lens blanks 2000a to 2000d according to Modifications 1 to 4 of the present embodiment.

Figure 24A:
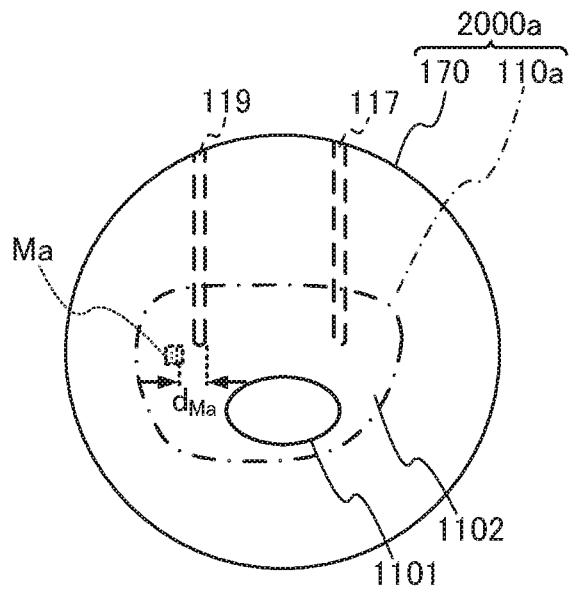
FIG. 24A is a planar view illustrating an example of a configuration of a lens blank according to Modification 1 of Embodiment 4.
Figure 24B:
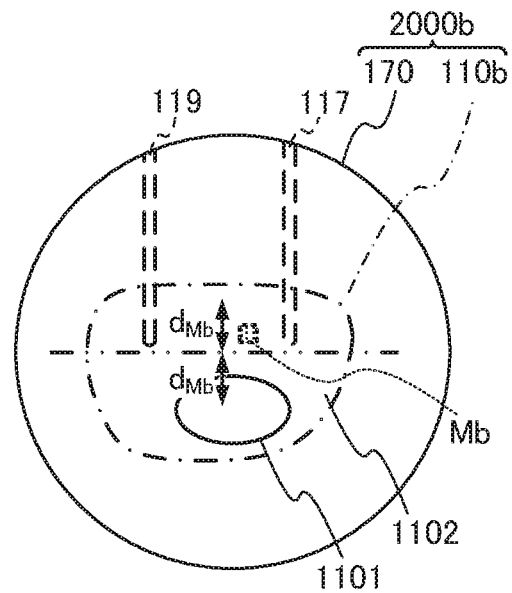
FIG. 24B is a planar view illustrating an example of a configuration of a lens blank according to Modification 2 of Embodiment 4.
Figure 24C:
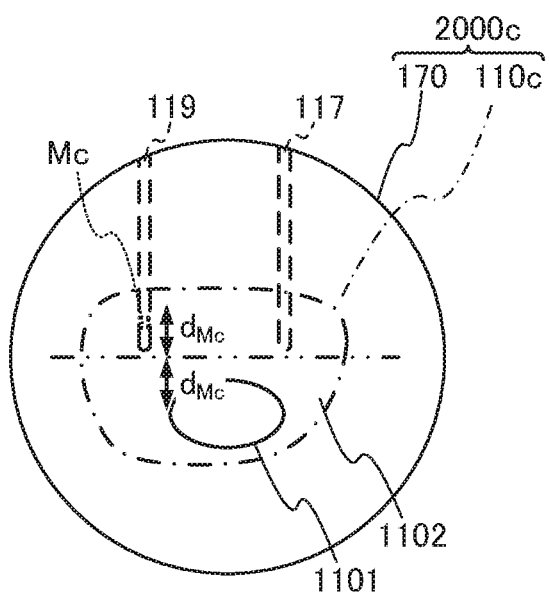
FIG. 24C is a planar view illustrating an example of a configuration of a lens blank according to Modification 3 of Embodiment 4.
Figure 24D:
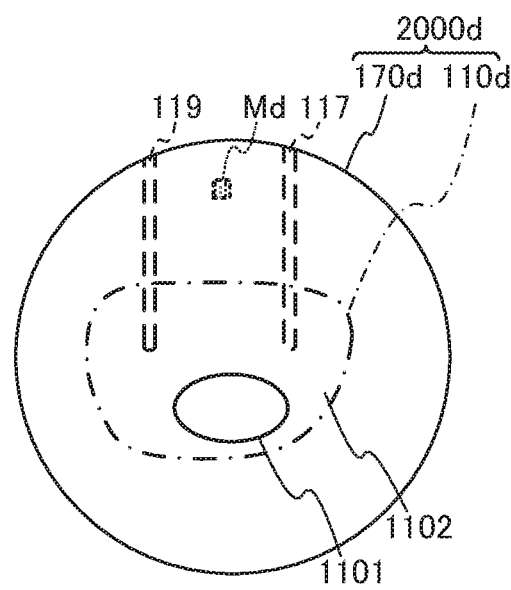
FIG. 24D is a planar view illustrating an example of a configuration of a lens blank according to Modification 4 of Embodiment 4.

FIG. 24A is a front view of lens blank 2000a according to Modification 1 of the present embodiment. FIG. 24B is a front view of lens blank 2000b according to Modification 2 of the present embodiment. FIG. 24C is a front view of lens blank 2000c according to Modification 3 of the present embodiment. FIG. 24D is a front view of lens blank 2000d according to Modification 4 of the present embodiment. Lens blanks 2000a to 2000d are different from lens blank 2000 only in that positions of marks Ma to Md are different from the position of mark M.

As described above, the mark to be placed on lens 110 is preferably placed in a position to be cut out of lens blank 2000 as lens 110.

As illustrated in FIG. 24A, in the front view of lens 110a (lens blank 2000a), mark Ma according to Modification 1 is preferably placed near the tip part of first auxiliary electrode 117 or the tip part of second auxiliary electrode 119.

In Modification 1 illustrated in FIG. 24A, mark Ma is placed near the tip part of second auxiliary electrode 119. In Modification 1, in a front view of lens 110a, at least a part of mark Ma is preferably placed in a region with distance $d_{Ma}$ equal to or shorter than 19 mm from the one or both of the tip part of first auxiliary electrode 117 and the tip part of second auxiliary electrode 119.

As illustrated in FIG. 24B, in a front view of lens 110b (lens blank 2000b), at least a part of mark Mb according to Modification 2 is preferably placed between first auxiliary electrode 117 and second auxiliary electrode 119.

As illustrated in FIG. 24C, in a front view of lens 110c (lens blank 2000c), at least a part of mark Mc according to Modification 3 is preferably placed so as to overlap with one or both of first auxiliary electrode 117 and second auxiliary electrode 119. In Modification 3, mark Mc is disposed so as to overlap with second auxiliary electrode 119 in the front view of lens 110c.

In Modification 2 (3) described above, at least a part of mark Mb(Mc) is preferably placed in a region with a distance $d_{Mb}$ ($d_{Mc}$) equal to or shorter than 12 mm from a virtual line (see a chain double-dashed line of FIGS. 24B (24C)) connecting between the tip part of first auxiliary electrode 117 and the tip part of second auxiliary electrode 119.

As illustrated in FIG. 24D, mark Md according to Modification 4 may be placed in blank part 170d. The position of mark Md to be disposed in blank part 170d is not particularly limited so long as being a region except for the region to be cut out as lens 110d in lens blank 2000d. In Modification 4, mark Md is placed between first auxiliary electrode 117 and second auxiliary electrode 119 in blank part 170d.

[Operation of Electronic Glasses]

Subsequently, an example of the operation of electronic glasses 100 will be described. First, a state (off-state) where no voltage is being applied to liquid crystal layer 115 of electronic glasses 100 will be described.

In the off-state, in first region 1101 of lens 110, the refractive index of liquid crystal layer 115 and the refractive index of each of first transparent substrate 111 and second transparent substrate 112 are almost the same. There thus occurs no lens effect attributable to liquid crystal layer 115. Therefore, in lens 110, the focal length (power) of first region 1101 and the focal length (power) of second region 1102 are almost the same as each other.

When a portion of housing 141 which corresponds to detection section 142 is touched by an object being a conductor (for example, the finger of the user), the detection pad of detection section 142 detects a change in capacitance based on the touch. The detection result of the touch is transmitted to control section 150.

When sensing the touch of the object in the off-state, control section 150 applies the voltage to liquid crystal layer 115 of lens 110. Thereby, the orientation of the liquid crystal material in liquid crystal layer 115 changes, and the refractive index of liquid crystal layer 115 changes (on-state).

In the on-state, the refractive index of liquid crystal layer 115 and the refractive index of each of first transparent substrate 111 and second transparent substrate 112 are different from each other. Hence the lens effect attributable to liquid crystal layer 115 occurs in first region 1101. Therefore, the focal length (power) of first region 1101 can be changed.

In the on-state, when the portion of housing 141 which corresponds to detection section 142 is touched by the object, the detection result of the touch is transmitted to control section 150 in the same manner as above. When sensing the touch of the object in the on-state, control section 150 stops applying the voltage to liquid crystal layer 115. Thereby, the orientation of the liquid crystal material in liquid crystal layer 115 returns to the state before the application of the voltage, and the refractive index of liquid crystal layer 115 also returns to the state before the application of the voltage (off-state).

As described above, in electronic glasses 100 according to the present embodiment, a touch of the object is sensed and then the focal length of first region 1101 in lens 110 can be switched.

(Effects)

In lens 110 of electronic glasses 100 according to the present embodiment, mark M including information is formed in intermediate layer 113 disposed between first transparent substrate 111 and second transparent substrate 112. Therefore, as compared with the conventional lens having a mark formed on the outer surface thereof, in lens 110 according to the present embodiment, mark M is unlikely to disappear or be tampered with.

Further, in the middle of the manufacturing process of lens 110, mark M can be formed in a layer to be intermediate layer 113. Therefore, as compared with the case of forming mark M after manufacturing of lens 110, even if mark M is failed to be formed adequately, it is possible to minimize the losses of the part and the material of lens 110.

For example, when the process of forming mark M is performed before the process of disposing liquid crystal layer 115, even if mark M is failed to be formed adequately, it is possible to suppress the losses of the materials such as the liquid crystal material and the adhesive.

In the above embodiments, the case has been described where one mark M is formed on lens 110, but the lens according to the present invention is not limited to this aspect. For example, a plurality of marks may be placed on one or both of blank part 170 and lens 110.

In the above embodiments, the electronic glasses with the pair of temples 140 having detection sections 142 have been described, but the eyewear according to the present invention are not limited to this aspect. For example, one temple may be made up only of a housing.

In the above embodiments, lens 110 having first region 1101 where the focal length can be changed by electric control has been described as the electroactive region. However, the lens according to the present invention is not limited to this aspect.

For example, lens may have, as the electroactive region, a region where a light transmittance can be changed by electric control. In this case, the intermediate layer has a light modulation layer containing an electrochromic material, a guest-host liquid crystal material, and the like. The light modulation layer can be disposed over the first region and the second region.

The present embodiment as thus described is not limited to the structure described above, but is applicable to a structure other than the structure described above by being subjected to various modification within a range not deviating from the gist of the invention. Further, the present embodiment can be performed in a combination with other embodiments in a technically consistent range.

Summary of Present Embodiment

The lens, the lens blank, and the eyewear according to Embodiment 4 described above include the following aspects:

[First Aspect]

A first aspect of the lens according to Embodiment 4 above is a lens having an electroactive region where an optical characteristic changes by electric control, the lens being provided with: a first transparent substrate; a second transparent substrate disposed on the first transparent substrate; and an intermediate layer disposed between the first transparent substrate and the second transparent substrate and having a first transparent conductive layer disposed on the first transparent substrate side and a second transparent conductive layer disposed on the second transparent substrate side. In the intermediate layer, a mark including information is formed.

According to the lens of the first aspect, it is possible to provide a lens for eyewear, a lens blank and eyewear having the lens, on which a mark hardly disappears or is hardly tampered with.

[Second Aspect]

A lens according to a second aspect is the lens according to the first aspect, in which the optical characteristic of the electroactive region changes by application of a voltage across the first transparent conductive layer and the second transparent conductive layer.

[Third Aspect]

A lens according to a third aspect is the lens according to the first or second aspect, in which a mark includes at least one of information on manufacturing of the lens, information on a material for the lens, information on performance of the lens, information on structural features of the lens, information used at the time of sale of the lens, and information on transportation of the lens.

[Fourth Aspect]

A lens according to a fourth aspect is the lens according to any one of the first to third aspects, in which the mark is placed on the more opposite side to a user of the lens than a middle point of the intermediate layer in a thickness direction of the lens.

[Fifth Aspect]

A lens according to a fifth aspect is the lens according to any one of the first to fourth aspects, in which the intermediate layer has a first auxiliary electrode extending inward from the outer edge of lens and is electrically connected to the first transparent conductive layer, and a second auxiliary electrode extending inward from the outer edge of lens and is electrically connected to the second transparent conductive layer.

[Sixth Aspect]

A lens according to a sixth aspect is the lens according to the fifth aspect, in which the first auxiliary electrode and the second auxiliary electrode are arranged so as to be adjacent to each other in a front view of the lens, and at least a part of the mark is placed between the first auxiliary electrode and the second auxiliary electrode in the front view of the lens.

[Seventh Aspect]

A lens according to a seventh aspect is the lens according to the fifth or sixth aspect, in which at least a part of the mark is placed in a region with a distance equal to or shorter than 12 mm from a virtual line connecting between the tip part of the first auxiliary electrode and the tip part of the second auxiliary electrode.

[Eighth Aspect]

A lens according to an eighth aspect is the lens according to any one of the fifth to seventh aspects, in which in the front view of the lens, at least a part of the mark is placed in a region with a distance equal to or shorter than 19 mm from the one or both of the tip part of the first auxiliary electrode and the tip part of the second auxiliary electrode.

[Ninth Aspect]

A lens according to a ninth aspect is the lens according to any one of the fifth to eighth aspects, in which in the front view of the lens, at least a part of the mark is placed so as to overlap with one or both of the first auxiliary electrode and the second auxiliary electrode.

[Tenth Aspect]

A lens according to a tenth aspect is the lens according to any one of the first to ninth aspects, in which in the front view of the lens, at least a part of the mark is placed in a region with a distance equal to or shorter than 24 mm from an electroactive region where a focal length can be changed.

[Eleventh Aspect]

A lens according to an eleventh aspect is the lens according to any one of the first to tenth aspects, in which the lens is a lens for eyewear, and when the lens is disposed in the frame for eyewear and in the front view of the eyewear, the mark is placed so as to be adjacent to the electroactive region where the focal length can be changed in the laterally outer-side region of the eyewear.

[Twelfth Aspect]

A lens according to a twelfth aspect is the lens according to any one of the first to eleventh aspects, in which the mark is formed in one or both of the first transparent conductive layer and the second transparent conductive layer by printing or engraving.

[Thirteenth Aspect]

A lens according to a thirteenth aspect is the lens according to the ninth aspect, in which the mark is formed by printing or engraving on one or both of the first auxiliary electrode and the second auxiliary electrode.

[Fourteenth Aspect]

A lens according to a fourteenth aspect is the lens according to any one of the first to thirteenth aspects, in which a conductive material constituting each of the first transparent conductive layer and the second transparent conductive layer contains ITO.

[Fifteenth Aspect]

A lens according to a fifteenth aspect is the lens according to any one of the first to fourteenth aspects, in which the intermediate layer further has a liquid crystal layer disposed between the first transparent substrate and the second transparent substrate and containing a liquid crystal material, in a region corresponding to the electroactive region where the focal length can be changed.

[Sixteenth Aspect]

Lens blank according to a sixteenth aspect is provided with: a lens; and a blank part formed together with the lens as a unit, in which the lens and the blank part each have a first transparent substrate, a second transparent substrate disposed on the first transparent substrate, and an intermediate layer disposed between the first transparent substrate and the second transparent and having a first transparent conductive layer disposed on the first transparent substrate side and a second transparent conductive layer disposed on the second transparent side. A mark including information is formed in the intermediate layer, and the mark is placed in a position of the intermediate layer which corresponds to one or both of the lens and the blank part.

[Seventeenth Aspect]

Eyewear according to a seventeenth aspect is provided with: the lens according to any one of the first to fifteenth aspects; a frame holding the lens; and a control section configured to control an optical characteristic of the electroactive region of the lens by controlling a voltage across the first transparent conductive layer and the second transparent conductive layer.

This application claims priority to Japanese Application No. 2016-253581 filed Dec. 27, 2016, Japanese Application No. 2016-253582 filed Dec. 27, 2016, and Japanese Application No. 2017-037313 filed Feb. 28, 2017, and the contents described in the specification, claims and drawings are incorporated herein by reference in their entirety.

INDUSTRIAL APPLICABILITY

A lens of the present invention can be used preferably as a lens for eyewear.

REFERENCE SIGNS LIST 10, 10a, 10b Electronic glasses (eyewear)
12, 12a Lens
14, 14a Lens
16, 16a Frame
18 Liquid crystal (electroactive section, focal-length changing section)
22, 22a Right-side rim (lens holder)
24, 24a Left-side rim (lens holder)
200 Upper rim element
201 First side rim element
202 Second side rim element
26 Bridge
30 Right-side temple (temple)
32 Left-side temple (temple)
42 Flexible cable (external electrode)
48, 50 Internal electrode
48A, 50A Lower end of electrode
60 Diffraction section (electroactive section, focal-length changing section)
68 Lens body
72 Conductive rubber
74 First fitting part (first region)
76, 76a to 76f Second fitting part (second region)
76A Front-side inclined surface
76B Rear-side inclined surface
78 Protruding part (exposed part)
83, 83a, 83b Wire
84, 84a, 84b, 84c, 84d, 84e Wire fitting groove (groove part)
85a, 85b, 85c Protrusion
86 Rubber placement groove (exposed part)
87 Wire fitting notch
VC1 Line passing through gravity center of blank body and extending in lateral direction
LC2 Diffraction-section center line (center line of electroactive section and center line of focal-length changing section)
C3 Gravity center of lens body
VC3 Line passing through gravity center of lens body and extending in lateral direction
LC3 Line (center line) passing through gravity center of lens body and extend in vertical direction
100 Electronic glasses (eyewear)
110, 110a to 110d Lens
1101 First region (electroactive region)
1102 Second region
1103 Protrusion
1104 Protruding strip
111 First transparent substrate
112 Second transparent substrate
113 Intermediate layer
114 first transparent conductive layer
1141 First slit
1142 Second slit
115 Liquid crystal layer
116 Second transparent conductive layer
1161 Third slit
1162 Fourth slit 117 First auxiliary electrode
118 Adhesive layer
119 Second auxiliary electrode
120 Frame
130 Front
131 Rim
132 Bridge
133 Nose pad
140 Temple
141 Housing
142 Detection section
150 Control section
160 Power source
170, 170d Blank part
180 Wiring
2000, 2000a to 2000d Lens blank
M, Ma to Md Mark

What is claimed is:

1. A lens, comprising:
a lens body; and
an internal electrode that is attached to the lens body, at least a part of the internal electrode being exposed in an outer edge part of the lens body, wherein:
a shape of a first region including an exposed part where the internal electrode is exposed and a shape of a second region not including the exposed part are different in the outer edge part of the lens body,
an outer edge part on an upper side of the lens body is the first region,
an outer edge part on a lower side of the lens body is the second region,
a boundary between the first region and the second region is located on each of right and left sides of the lens body, and
the boundary between the first region and the second region is located below a bridge or a temple of a frame of eyewear, with the lens body held in the frame.

2. The lens according to claim 1, wherein
the shape of the first region has a plane at a tip, and
an end part of the internal electrode is exposed on the plane.

3. The lens according to claim 2, wherein:
the first region has a protruding shape including the plane at the tip, and
the shape of the second region is a V-shape.

4. The lens according to claim 1, wherein the shape of the second region is sharp at a tip.

5. The lens according to claim 1, wherein the shape of the second region has a groove part at a tip.

6. The lens according to claim 1, wherein a thickness of an end part of the lens body in the first region is larger than a thickness of an end part of the lens body in the second region as viewed in a cross section cut along a thickness direction of the lens body.

7. The lens according to claim 1, wherein:
the lens body is held in the frame,
the internal electrode is buried in the lens body and electrically in contact with an external electrode provided in the frame,
the first region is a first fitting part that is fitted into the frame, with the exposed part in contact with the external electrode, and
the second region is a second fitting part that is connected to the first region and fitted into the frame.

8. The lens according to claim 1, wherein at least a thickness dimension of the exposed part in the first region is different from a thickness dimension of a center portion of the lens body as viewed in a cross section cut along a thickness direction of the lens body.

9. The lens according to claim 8, wherein at least the thickness dimension of the exposed part in the first region is set to be smaller than the thickness dimension of the center portion of the lens body as viewed in a cross section cut along the thickness direction of the lens body.

10. An eyewear comprising:
the lens according to claim 1;
a frame including a lens holder by which the lens is held, the frame being a portion to be worn by a user; and
an external electrode disposed between the lens holder and the lens.

11. The eyewear according to claim 10, wherein a conductive rubber is disposed between the exposed part and the external electrode.

* * * * *